US007511772B2

(12) United States Patent
Fujine et al.

(10) Patent No.: US 7,511,772 B2
(45) Date of Patent: Mar. 31, 2009

(54) LIQUID CRYSTAL TELEVISION RECEIVER FOR CORRECTING OPTICAL RESPONSE CHARACTERISTICS, LCD CONTROL METHOD, AND RECORDING MEDIUM

(75) Inventors: Toshiyuki Fujine, Sakura (JP); Toshihiko Osada, Sakura (JP); Yuji Kikuchi, Nasushiobara (JP); Takashi Yoshii, Osaka (JP)

(73) Assignee: Sharp Kabushiki Kaisha, Osaka (JP)

(*) Notice: Subject to any disclaimer, the term of this patent is extended or adjusted under 35 U.S.C. 154(b) by 623 days.

(21) Appl. No.: 10/550,003

(22) PCT Filed: Mar. 23, 2004

(86) PCT No.: PCT/JP2004/003983

§ 371 (c)(1),
(2), (4) Date: Sep. 23, 2005

(87) PCT Pub. No.: WO2004/086349

PCT Pub. Date: Oct. 7, 2004

(65) Prior Publication Data

US 2006/0187361 A1 Aug. 24, 2006

(30) Foreign Application Priority Data

Mar. 26, 2003 (JP) ............................ 2003-085260
Nov. 21, 2003 (JP) ............................ 2003-392917
Mar. 18, 2004 (JP) ............................ 2004-079235

(51) Int. Cl.
*H04N 13/00* (2006.01)
*G09G 3/36* (2006.01)

(52) U.S. Cl. ........................................ 348/790; 345/87

(58) Field of Classification Search ................. 348/790, 348/725, 552, 441, 445, 448, 449; 345/89, 345/98, 60, 213, 204
See application file for complete search history.

(56) References Cited

U.S. PATENT DOCUMENTS

| | | | | |
|---|---|---|---|---|
| 5,347,294 | A | 9/1994 | Usui et al. | |
| 5,465,102 | A | 11/1995 | Usui et al. | |
| 5,844,533 | A | 12/1998 | Usui et al. | |
| 6,501,451 | B1 | 12/2002 | Sakashita | |
| 6,674,478 | B2 * | 1/2004 | Miyazaki et al. | 348/441 |

(Continued)

FOREIGN PATENT DOCUMENTS

| | | | |
|---|---|---|---|
| JP | 4-318516 | A | 11/1992 |

(Continued)

*Primary Examiner*—Paulos M Natnael
(74) *Attorney, Agent, or Firm*—Birch, Stewart, Kolasch & Birch, LLP

(57) ABSTRACT

When a video signal type detecting section detects a video signal of PAL/SECAM (50 Hz) video signal, the input image data is subjected to enhancing conversion with a degree lower than the degree of enhancing conversion in the case of NTSC (60 Hz). With this, the response speed of liquid crystal is improved and an image noise on account of excessive enhancement is eliminated, so that the deterioration in image quality is prevented. As a result, the enhancing conversion with respect to the input image data is performed in such a manner as to compensate the optical characteristics of the liquid crystal display panel, and an image noise on account of excessive enhancing conversion with respect to PAL/SE-CAM (50 Hz) image data, and hence high-quality image display is realized.

15 Claims, 19 Drawing Sheets

U.S. PATENT DOCUMENTS

| | | | | |
|---|---|---|---|---|
| 6,707,439 | B2 * | 3/2004 | Ijima et al. | 345/87 |
| 6,753,831 | B1 * | 6/2004 | Ide et al. | 345/60 |
| 7,095,393 | B2 * | 8/2006 | Lee | 345/89 |
| 7,206,025 | B2 * | 4/2007 | Choi | 348/441 |
| 7,250,979 | B2 * | 7/2007 | Choi | 348/441 |
| 2002/0044151 | A1 | 4/2002 | Iijima et al. | |
| 2003/0038768 | A1 | 2/2003 | Sakashita | |
| 2003/0095088 | A1 | 5/2003 | Ham | |
| 2003/0095090 | A1 | 5/2003 | Ham | |

FOREIGN PATENT DOCUMENTS

| | | | |
|---|---|---|---|
| JP | 4-365094 | A | 12/1992 |
| JP | 5-108032 | A | 4/1993 |
| JP | 11-126050 | A | 5/1999 |
| JP | 2000-338916 | A | 12/2000 |
| JP | 2002-108294 | A | 4/2002 |
| JP | 2003-108103 | A | 4/2003 |
| JP | 2003-114663 | A | 4/2003 |

* cited by examiner

FIG. 16

PRIOR ART data of current frame (columns) / data of directly previous frame (rows)

| | 0 | 32 | 64 | 96 | 128 | 160 | 192 | 224 | 255 |
|---|---|---|---|---|---|---|---|---|---|
| 0 | 0 | 51 | 118 | 165 | 194 | 214 | 230 | 242 | 255 |
| 32 | 0 | 32 | 120 | 159 | 183 | 206 | 226 | 240 | 255 |
| 64 | 0 | 12 | 64 | 110 | 150 | 182 | 209 | 234 | 255 |
| 96 | 0 | 0 | 48 | 96 | 140 | 175 | 204 | 232 | 255 |
| 128 | 0 | 0 | 43 | 81 | 128 | 167 | 201 | 232 | 255 |
| 160 | 0 | 0 | 35 | 66 | 117 | 160 | 196 | 229 | 255 |
| 192 | 0 | 0 | 2 | 56 | 105 | 152 | 192 | 227 | 255 |
| 224 | 0 | 0 | 0 | 50 | 85 | 139 | 186 | 224 | 255 |
| 255 | 0 | 0 | 0 | 44 | 75 | 136 | 181 | 215 | 255 |

LIQUID CRYSTAL TELEVISION RECEIVER FOR CORRECTING OPTICAL RESPONSE CHARACTERISTICS, LCD CONTROL METHOD, AND RECORDING MEDIUM

TECHNICAL FIELD

The present invention relates to a liquid crystal television receiver that reproduces images using a liquid crystal display panel, and particularly relates to a liquid crystal television receiver that can improve optical response characteristics of the liquid crystal display panel.

BACKGROUND ART

In these years, light and thin displays have been in high demand because light and thin personal computers and television receivers have appeared. In response to the demand, flat-panel displays such as liquid crystal displays (LCD) have been developed for replacing cathode ray tubes (CRT).

An LCD is a display in which an electric field is applied to an anisotropic dielectric liquid crystal layer between two substrates, and a desired video signal is obtained by controlling an amount of light passing through the substrates by adjusting the intensity of the electric field. Such an LCD is typically adopted as a simple flat-panel display for a mobile device. In particular, a TFT LCD adopting thin film transistors (TFT) as switching elements is commonly used.

Since nowadays LCDs are adopted not only to a display apparatus of a computer but also to a display apparatus of a television receiver, the LCDs are often required to support moving images. However, conventional LCDs cannot easily support moving images on account of a slow response speed.

To solve this problem of the response speed of liquid crystal, there has been a known method of driving liquid crystal (e.g. Japanese Laid-Open Patent Application No. 365094/1992), the method being arranged in such a manner that, in accordance with the combination of an input video signal of the directly previous frame and an input video signal of the current frame, a drive voltage that is higher (in the case of overshoot) or lower (in the case of undershoot) than a predetermined gray level voltage of an input video signal of the current frame is supplied to a liquid crystal display panel. Hereinafter, this driving method is termed "overshoot (OS) drive".

It has been known that the response speed of liquid crystal is temperature-dependent to a great extent. In this relation, there is a liquid crystal panel driving apparatus that always keeps the response speed of gray level variation to be optimum and maintains the quality of displayed images, even when the temperature of the liquid crystal panel varies. Such a liquid crystal panel driving apparatus is disclosed by, for instance, Japanese Laid-Open Patent Application No. 318516/1992.

In reference to FIGS. 15-19, the following will describe the aforesaid apparatus that performs overshoot drive in order to correct the optical response characteristics of the liquid crystal panel, in accordance with the working temperature. Note that, FIG. 15 is a block diagram showing a substantial part of a conventional liquid crystal display apparatus, FIG. 16 illustrates an example of the contents of an OS table memory, FIG. 17 is a functional block diagram showing the outline of a control CPU, FIG. 18 illustrates the relationship between a temperature in the apparatus and a lookup table memory, and FIG. 19 illustrates the relationship between a voltage applied to liquid crystal and the response of the liquid crystal.

FIG. 15 illustrates the following members: members 1*a* through 1*d* are OS table memories (ROMs) storing respective OS parameters (enhancing conversion parameters) each corresponding to gray level transition around one frame period of input image data, the OS parameters being stored in such a manner as to one-to-one correspond to respective temperature ranges in the apparatus; a member 15 is a frame memory (FM) that stores input image data for one frame; and a member 14H is an enhancing conversion section that (i) compares input image data (current data) of an M-th frame to be displayed next with input image data (previous data) of an (M−1)-th frame, the previous data having been stored in the frame memory 15, (ii) reads out an OS parameter that corresponds to the result of the aforesaid comparison (gray level transition), from one of the OS table memories (ROMs) 1*a* through 1*d*, and (iii) determines, in accordance with the OS parameter having bean read out, enhancing conversion data (writing gray level data) required for the image reproduction in the M-th frame.

In addition to the above, FIG. 15 also illustrates the following members: a member 16 is a liquid crystal controller that outputs a liquid crystal drive signal to a gate driver 18 and a source driver 19 of a liquid crystal panel 17, in accordance with the enhancing conversion data supplied from the enhancing conversion section 14H; a member 20 is a temperature sensor for detecting a temperature in the apparatus; and a member 12H is a control CPU that outputs a switching control signal for switching the OS parameters used for the enhancing conversion of image data, the switching being performed by selecting and referring to one of the OS table memories (ROMs) 1*a* through 1*d*, with reference to the temperature detected by the temperature sensor 20.

The OS parameters LEVEL 1 through LEVEL 4 stored in the respective OS table memories (ROMs) 1*a* through 1*d* are obtained in advance from actual values of the optical response characteristics of the liquid crystal display panel 17, under reference temperatures T1, T2, T3, and T4 (T1<T2<T3<T4). The order of the degrees of enhancing conversion is LEVEL 1>LEVEL 2>LEVEL 3>LEVEL 4.

For instance, when the number of display signal levels, i.e. the number of sets of display data is 256 gray scales for 8 bits, the OS table memories (ROMs) 1*a* through 1*d* may have OS parameter values (actual values) for all 256 gray levels. Apart from this, the following arrangement shown in FIG. 16 may be adopted: the OS table memories (ROMs) 1*a* through 1*d* only store 9×9 OS parameter values (actual values) each representing 32 gray levels, and the sets of enhancing conversion data for the remaining gray levels are calculated by performing, for instance, linear interpolation using the aforesaid actual values. This arrangement makes it possible to reduce the storage capacity of the OS table memories (ROMs).

As shown in FIG. 17, the control CPU 12H includes: a threshold discriminating section 12*a* that compares the temperature detection data produced by the temperature sensor 20 with predetermined threshold temperature data values Th1, Th2, and Th3; and a control signal output section 12*b* that generates and outputs a switching control signal that switches the OS parameters LEVEL 1 through LEVEL 4 by selecting one of the OS table memories (ROMs) 1*a* through 1*d* with reference to the result of the comparison by the threshold discriminating section 12*a*.

As FIG. 18 illustrates, when the temperature in the apparatus, which is detected by the temperature sensor 20, is not higher than the switching threshold temperature Th1 (=15° C.), the control CPU 12H instructs the enhancing conversion section 14H to select and refer to the OS table memory (ROM) 1a. On this account, the enhancing conversion section 14H performs the enhancing conversion of input image data, with reference to the OS parameter LEVEL 1 stored in the OS table memory (ROM) 1a.

When the temperature in the apparatus is higher than the switching threshold temperature Th1 (=15° C.) but not higher than the switching threshold temperature Th2 (=25° C.), the control CPU 12H instructs the enhancing conversion section 14H to select and refer to the OS table memory (ROM) 1b. On this account, the enhancing conversion section 14H performs the enhancing conversion of input image data, with reference to the OS parameter LEVEL 2 stored in the OS table memory (ROM) 1b.

When the temperature in the apparatus is higher than the switching threshold temperature Th2 (=25° C.) but not higher than the switching threshold temperature Th3 (=35° C.), the control CPU 12H instructs the enhancing conversion section 14H to select and refer to the OS table memory (ROM) 1c. On this account, the enhancing conversion section 14H performs the enhancing conversion of input image data, with reference to the OS parameter LEVEL 3 stored in the OS table memory (ROM) 1c.

When the temperature in the apparatus is higher than the switching threshold temperature Th3 (=35° C.), the control CPU 12H instructs the enhancing conversion section 14H to select and refer to the OS table memory (ROM) 1d. On this account, the enhancing conversion section 14H performs the enhancing conversion of input image data, with reference to the OS parameter LEVEL 4 stored in the OS table memory (ROM) 1d.

Liquid crystal display panels typically have the following problem: a time required for transit from one halftone to another halftone is long, and the follow-up to an input signal is significantly bad when the temperature is low, so that the response time is long. For this reason, the halftone cannot be reproduced within one frame period (16.7 msec in a case of 60 Hz progressive scanning), and hence an afterimage (image sticking) appears and the halftone is not properly reproduced. Using the aforesaid overshoot drive circuit, a desired halftone can be reproduced within a short period (one frame period) as shown in FIG. 19, by subjecting the gray level of the input image data to the enhancing conversion in the direction of the gray level transition, in such a manner as to cause the brightness of the liquid crystal display panel to attain the brightness corresponding to a target grayscale defined by the input image data, after a predetermined frame period elapses.

DISCLOSURE OF INVENTION

Incidentally, in the aforesaid overshoot drive, the gray level of input image data is subjected to enhancing conversion in the direction of gray level transition, in such a manner as to cause a liquid crystal display panel to reach a target grayscale brightness defined by the input image data, after a predetermined vertical display period elapses. When input image data of a different broadcasting standard is inputted so that a vertical frequency (vertical display cycle) of the input image data becomes different, the grayscale brightness that the liquid crystal reaches after one vertical display period also becomes different, even if the conditions other than the broadcasting standard are the same. For this reason, the overshoot drive cannot be properly carried out in the aforesaid case.

For example, currently-used television broadcasting standards are: NTSC where the vertical frequency is 60 Hz (525 scanning lines); and PAL and SECAM where the vertical frequency is 50 Hz (625 scanning lines). In this relation, a multi-television receiver that can receive television signals of those broadcasting standards and reproduce images based thereon has been developed. However, when such a multi-television receiver adopts the aforesaid conventional liquid crystal display apparatus, the overshoot drive cannot be properly done. On this account, an error in inter-frame data is enlarged and an image noise not inherent in original input image data is produced. As a result, the quality of displayed images deteriorates.

The objective of the present invention is to provide a liquid crystal television receiver that can restrain the degradation of image quality, which occurs on account of an image noise not inherent in original input image data. The image noise is produced in the following case: when input image data, whose television broadcasting standard (video format) is changed, is subjected to enhancing conversion identical with that for the image data before the change, an error in inter-frame data is enlarged.

To achieve the above-described objective, the liquid crystal television receiver of the present invention corrects optical response characteristics of a liquid crystal panel by subjecting image data supplied to the liquid crystal display panel to enhancing conversion at least in accordance with image data of a directly previous vertical period and image data of a current vertical period, the liquid crystal television receiver being capable of reproducing images based on image data of more than one broadcasting standard, the liquid crystal television receiver being characterized by comprising: signal type detection means for detecting whether input image data is a video signal of a first broadcasting standard or a video signal of a second broadcasting standard, the video signal of the first broadcasting standard being different, in terms of a vertical frequency, from the video signal of the second broadcasting standard; and enhancing conversion means for subjecting the input image data to enhancing conversion, in such a manner as to cause the liquid crystal panel to have a transmittance indicated by the input image data, within a predetermined period of time (pixel rewriting cycle), and in accordance with a result of detection by the signal type detection means, a degree of the enhancing conversion of the image data by the enhancing conversion means being varied. It is noted that the vertical period is a period of one frame. For instance, in a case where an entire image reproduced based on image data for one frame is scanned and written in during one frame period of the image data, one vertical period is equal to one vertical display period. Also, the enhancing conversion of the image data is performed in increments of one pixel.

The liquid crystal television receiver of the present invention is characterized by comprising: a table memory that stores an enhancing conversion parameter specified by the image data of the directly previous vertical period and the image data of the current vertical period, the enhancing conversion means including: an operation section that performs an operation on the image data so as to enhance the image data, using the enhancing conversion parameter; and a multiplying section that multiplies output data of the operation section by a coefficient corresponding to the result of the detection by the signal type detection means.

The liquid crystal television receiver of the present invention is characterized in that, when the input image data is the video signal of the second broadcasting standard, the coefficient of the multiplying section is smaller than the coefficient in the case where the input image data is the video signal of the first broadcasting standard.

The liquid crystal television receiver of the present invention is characterized by comprising: a first table memory that stores an enhancing conversion parameter specified by the image data of the current vertical period and the image data of the directly previous vertical period, the first table memory being referred to when the input image data is the video signal of the first broadcasting standard; and a second table memory that stores an enhancing conversion parameter specified by the image data of the current vertical period and the image data of the directly previous vertical period, the second table memory being referred to when the input image data is the video signal of the second broadcasting standard, the enhancing conversion means including an operation section that performs, using the enhancing conversion parameter read out from the first or second table memory in accordance with the result of the detection by the signal type detection means, an operation on the image data so as to enhance the image data.

The liquid crystal television receiver of the present invention is characterized in that, the enhancing conversion parameter when the input image data is the video signal of the second broadcasting standard is smaller than the enhancing conversion parameter when the input image data is the video signal of the first broadcasting standard.

The liquid crystal television receiver of the present invention is characterized by further comprising temperature detection means that detects a temperature in the apparatus, and the enhancing conversion means varies the degree of enhancing conversion with respect to the image data, based on the result of the detection by the temperature detection means.

The liquid crystal television receiver of the present invention is characterized by comprising: a table memory that stores an enhancing conversion parameter specified by the image data of the directly previous vertical period and the image data of the current vertical period, the enhancing conversion means including: an operation section that performs an operation on the image data so as to enhance the image data, using the enhancing conversion parameter; and a multiplying section that multiplies output data of the operation section by a coefficient corresponding to the result of the detection by the signal type detection means and the result of the detection by the temperature detection means.

The liquid crystal television receiver of the present invention is characterized by comprising: a first table memory that stores an enhancing conversion parameter specified by the image data of the current vertical period and the image data of the directly previous vertical period, the first table memory being referred to when the input image data is the video signal of the first broadcasting standard; and a second table memory that stores an enhancing conversion parameter specified by the image data of the current vertical period and the image data of the directly previous vertical period, the second table memory being referred to when the input image data is the video signal of the second broadcasting standard, the enhancing conversion means including: an operation section that performs, using the enhancing conversion parameter read out from the first or second table memory in accordance with the result of the detection by the signal type detection means, an operation on the image data so as to enhance the image data; and a multiplying section that multiplies output data of the operation section by a coefficient corresponding to the result of the detection by the temperature detection means.

The liquid crystal television receiver of the present invention is characterized by further comprising: first table memories that store enhancing conversion parameters that correspond to respective temperatures in the liquid crystal television receiver and are specified by the image data of the current vertical period and the image data of the directly previous vertical period, the first table memories being referred to when the input image data is the video signal of the first broadcasting standard; and second table memories that store enhancing conversion parameters that correspond to respective temperatures in the liquid crystal television receiver and are specified by the image data of the current vertical period and the image data of the directly previous vertical period, the second table memories being referred to when the input image data is the video signal of the second broadcasting standard, the enhancing conversion means including an operation section that performs, using the enhancing conversion parameter read out from one of the first and second table memories in accordance with the result of the detection by the signal type detection means and the result of the detection by the temperature detection means, an operation on the image data so as to enhance the image data.

The liquid crystal television receiver of the present invention is characterized by comprising: a table memory that stores enhancing conversion parameters that correspond to respective temperatures in the liquid crystal television receiver and are specified by the image data of the current vertical period and the image data of the directly previous vertical period, the enhancing conversion means including an operation section that performs, using the enhancing conversion parameter read out from the table memory, an operation on the image data so as to enhance the image data, in accordance with a result of comparison between (i) a switching temperature determined by the result of the detection by the signal type detection means and (ii) the result of the detection by the temperature detection means.

The liquid crystal television receiver of the present invention is characterized by comprising: a control means that controls switching and selection of the enhancing conversion parameters, the control means including: an operation section that performs, on temperature data detected by the temperature detection means, a predetermined operation corresponding to each signal type of the input image data; a threshold discriminating section that compares the temperature data, which has been subjected to the operation by the operation section, with predetermined threshold temperature data; and a control signal output section that generates a switching control signal with which the enhancing conversion parameters are switched and controlled, in accordance with a result of comparison by the threshold discriminating section.

The liquid crystal television receiver of the present invention is characterized by comprising control means that controls switching and selection of the enhancing conversion parameters, the control means including: a threshold discriminating section that compares the temperature data detected by the temperature detection means with predetermined temperature data corresponding to each signal type of the input image data; and a control signal output section that generates a switching control signal with which the enhancing conversion parameters are switched and controlled in accordance with a result of comparison by the threshold discriminating section.

A liquid crystal display control method of the present invention is characterized by correcting optical response characteristics of a liquid crystal display panel, by subjecting image data supplied to the liquid crystal display panel to enhancing conversion at least in accordance with image data of a directly previous vertical period and image data of a current vertical period, the liquid crystal panel being capable of reproducing images based on image data of more than one broadcasting standard, the method comprising the steps of: (i) detecting whether a signal type of input image data is a video signal of a first broadcasting standard or a video signal of a second broadcasting standard, the video signal of the first broadcasting standard being different, in terms of a vertical frequency, from the video signal of the second broadcasting;

and (ii) subjecting the image data to the enhancing conversion, in such a manner as to cause the liquid crystal panel to have a transmittance indicated by the image data, within a predetermined period of time, and in accordance with a result of detection of the signal type, a degree of the enhancing conversion of the image data being varied.

The liquid crystal control method of the present invention is characterized by comprising the steps of: (iii) referring to a table memory that stores an enhancing conversion parameter specified by the image data of the directly previous vertical period and the image data of the current vertical period; (iv) performing an operation on the image data so as to enhance the image data, using the enhancing conversion parameter; and (v) multiplying output data as a result of the step (iv) by a coefficient corresponding to the signal type detected in the step (i).

The liquid crystal control method of the present invention is characterized by comprising the steps of: (iii) referring to a first table memory that stores an enhancing conversion parameter specified by the image data of the directly previous vertical period and the image data of the current vertical period, the first table memory being referred to in a case where the input image data is the video signal of the first broadcasting standard; (iv) referring to a second table memory that stores an enhancing conversion parameter specified by the image data of the directly previous vertical period and the image data of the current vertical period, the second table memory being referred to in a case where the input image data is the video signal of the second broadcasting standard; and (v) performing an operation on the image data so as to enhance the image data, using the enhancing conversion parameter read out from the first or second table memory in accordance with the signal type detected in the step (i).

The liquid crystal control method of the present invention is characterized by comprising the steps of: (iii) detecting a temperature in an apparatus; and (iv) varying the degree of the enhancing conversion on the image data, in accordance with the temperature detected in the step (iii).

The liquid crystal control method of the present invention is characterized by comprising the steps of: (v) referring to a table memory that stores an enhancing conversion parameter specified by the image data of the directly previous vertical period and the image data of the current vertical period; (vi) performing an operation on the image data so as to enhance the image data, using the enhancing conversion parameter; and (vii) multiplying output data as a result of the step (vi) by a coefficient corresponding to the signal type detected in the step (i) and the temperature detected in the step (iii).

The liquid crystal control method of the present invention is characterized by comprising the steps of: (v) referring to a first table memory that stores an enhancing conversion parameter specified by the image data of the directly previous vertical period and the image data of the current vertical period, the first table memory being referred to in a case where the input image data is the video signal of the first broadcasting standard; (vi) referring to a second table memory that stores an enhancing conversion parameter specified by the image data of the directly previous vertical period and the image data of the current vertical period, the second table memory being referred to in a case where the input image data is the video signal of the second broadcasting standard; (vii) performing an operation on the image data so as to enhance the image data, using the enhancing conversion parameter read out from the first or second table memory in accordance with the signal type detected in the step (i); and (viii) multiplying output data as a result of the step (vii) by a coefficient corresponding to each temperature detected in the step (iii).

The liquid crystal control method of the present invention is characterized by comprising the steps of: (v) referring to first table memories that store enhancing conversion parameters that correspond to respective temperatures in the apparatus and are specified by the image data of the current vertical period and the image data of the directly previous vertical period, the first table memories being referred to in a case where the input image data is the video signal of the first broadcasting standard; (vi) referring to second table memories that store enhancing conversion parameters that correspond to respective temperatures in the apparatus and are specified by the image data of the current vertical period and the image data of the directly previous vertical period, the second table memories being referred to in a case where the input image data is the video signal of the second broadcasting standard; and (vii) in accordance with the signal type detected in the step (i) and the temperature detected in the step (iii), performing an operation on the image data so as to enhance the image data, using the enhancing conversion parameter read out from one of the first and second table memories.

The liquid crystal control method of the present invention is characterized by comprising the steps of: (v) referring to table memories that store enhancing conversion parameters that correspond to respective temperatures in the apparatus and are specified by the image data of the directly previous vertical period and the image data of the current vertical period; and (vi) performing an operation on the image data so as to enhance the image data, using the enhancing conversion parameter read out from the table memories with reference to a result of comparison between a switching temperature determined by the signal type detected in the step (i) and the temperature detected in the step (iii).

The liquid crystal control method of the present invention is characterized by comprising the steps of: (vii) performing, on temperature data corresponding to the temperature detected in the step (iii), a predetermined operation corresponding to each signal type of the input image data; (viii) comparing the temperature data after being subjected to the predetermined operation with predetermined threshold temperature data; and (ix) in accordance with a comparison in the step (viii), generating a switching control signal for switching and controlling the enhancing conversion parameters.

The liquid crystal control method of the present invention is characterized by (vii) comparing temperature data corresponding to the temperature detected in the step (iii) with predetermined threshold temperature data corresponding to each signal type of the input image data; and (viii) in accordance with a comparison in the step (vii), generating a switching control signal for switching and controlling the enhancing conversion parameters.

The above-described liquid crystal television receiver may be realized by hardware or may be realized by causing a computer to execute a program. More specifically, the program of the present invention is a program for a computer controlling a liquid crystal television receiver capable of reproducing images based on image data of more than one broadcasting standards, the liquid crystal television receiver correcting optical response characteristics of a liquid crystal display panel by performing an enhancing conversion of image data supplied to the liquid crystal display panel, in accordance with image data of a directly previous vertical period and image data of a current vertical period, in such a manner as to causing the liquid crystal panel to have a transmittance specified by the image data, within a predetermined period of time, the program causing the computer to perform a step of varying a degree of the enhancing conversion of the image data, in accordance with a result of detection of whether a signal type of input image data is a video signal of a first broadcasting standard or a video signal of a second broadcasting standard, the video signal of the first broadcasting standard being different, in terms of a vertical frequency, from the video signal of the second broadcasting. Also, a recording medium of the present invention is a recording medium recoding the above-described program.

The liquid crystal television receiver of the present invention detects a signal type of input image data by signal type detection means, i.e. detects whether the input image data is a video signal of a first broadcasting standard (video format) or a video signal of a second broadcasting standard (video format). In accordance with the result of the detection of the signal type, the liquid crystal television receiver controls and varies the degree of enhancing conversion with respect to the input image data, which is performed in the enhancing conversion means. As a result, when the input image data is the video signal of the second broadcasting standard (video format) where the frame cycle is longer than the frame cycle in the case of the first broadcasting standard, the degree of enhancing conversion is made lower than the degree of enhancing conversion when the input image data is the video signal of the first broadcasting standard (video format). With this, the enhancing conversion of the input image data can be performed in such a manner as to always cause, within a predetermined period (pixel rewriting cycle), the liquid crystal display panel to obtain a transmittance defined by the input image data, and hence high-quality image display is realized.

In this manner, the liquid crystal television receiver of the present invention can always figure out correct enhancing conversion data and supply the same to the liquid crystal display panel, in response to the input image data of different television broadcasting standards (video formats). For this reason, high-quality image display can be realized, irrespective of the type of a broadcasting standard (video format) on which the image data is based.

For a fuller understanding of the nature and advantages of the invention, reference should be made to the ensuing detailed description taken in conjunction with the accompanying drawings.

BRIEF DESCRIPTION OF DRAWINGS

FIG. 16 illustrates an example of an OS parameter stored in the OS table memory (ROM) in FIG. 15.

BEST MODE FOR CARRYING OUT THE INVENTION

In a liquid crystal display apparatus (liquid crystal television receiver) of the present invention, the enhancing conversion by the aforesaid overshoot drive is performed with respect to input image data, in order to improve the response speed of liquid crystal. In this regard, a PAL/SECAM (50 Hz) video signal has a frame cycle longer than that of a NTSC (60 Hz) video signal. If these sets of image data are subjected to a single enhancing conversion, an error is observed in brightness of a liquid crystal display panel attained after one frame period, so that the quality of a displayed image deteriorates.

To solve this problem, the degree of the enhancing conversion with respect to the image data is lowered when the input image data is a PAL/SECAM (50 Hz) video signal, as compared to a case where the input image data is a NTSC (60 Hz) video signal. With this, the optical response characteristics of the liquid crystal display panel are corrected, the occurrence of afterimage and trace is restrained, and image noise on account of excessive enhancing conversion of the image data is restrained. As a result, a high-quality image can be displayed. Note that, hereinafter, the NTSC (60 Hz) video signal will be referred to a video signal of first broadcasting standard (video format), and the PAL/SECAM (50 Hz) video signal will be referred to as a video signal of second broadcasting standard (video format). The present invention will be described in detail with reference to Embodiments, but the present invention is by no means limited to these embodiments.

Embodiment 1

Figure 1:
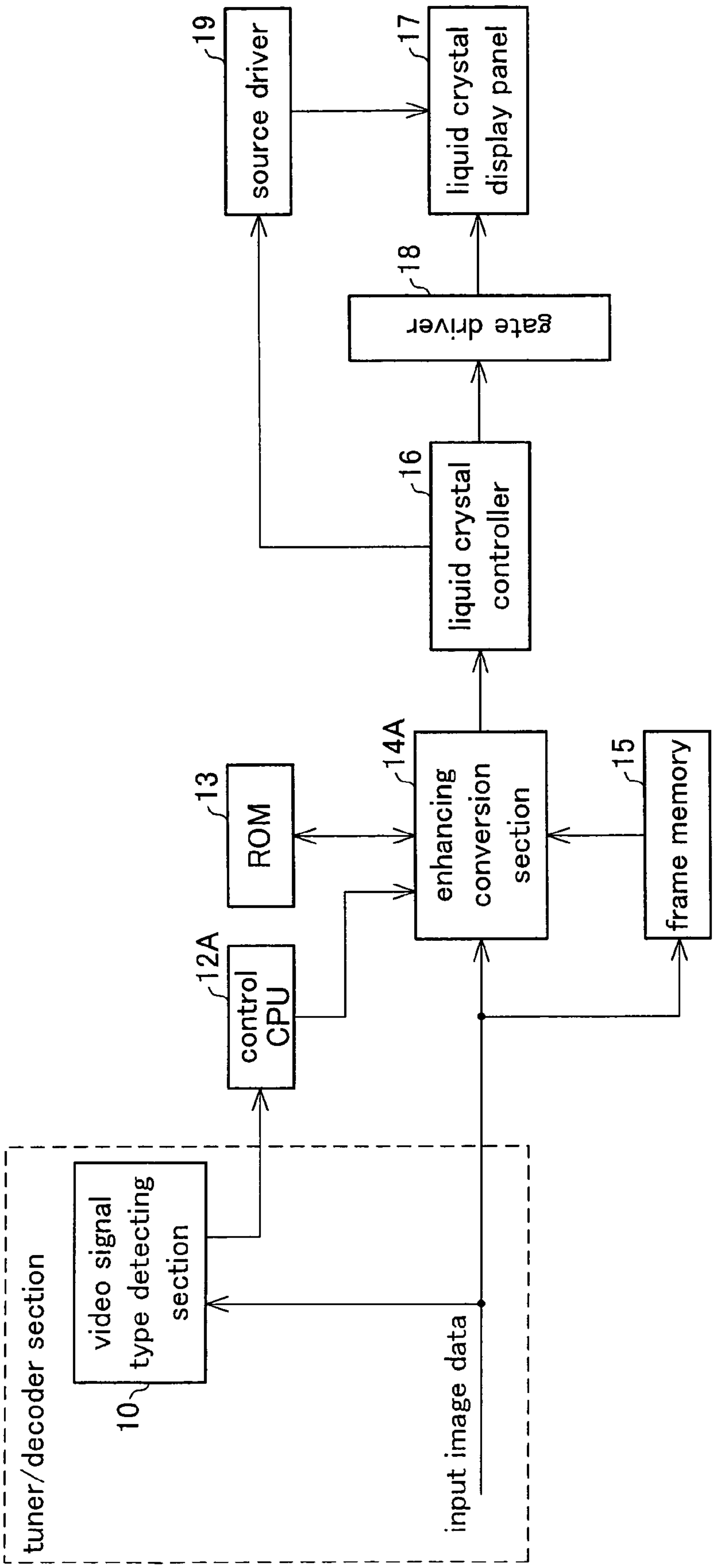
FIG. 1 illustrates a liquid crystal display apparatus of Embodiment 1 of the present invention.
Figure 2:
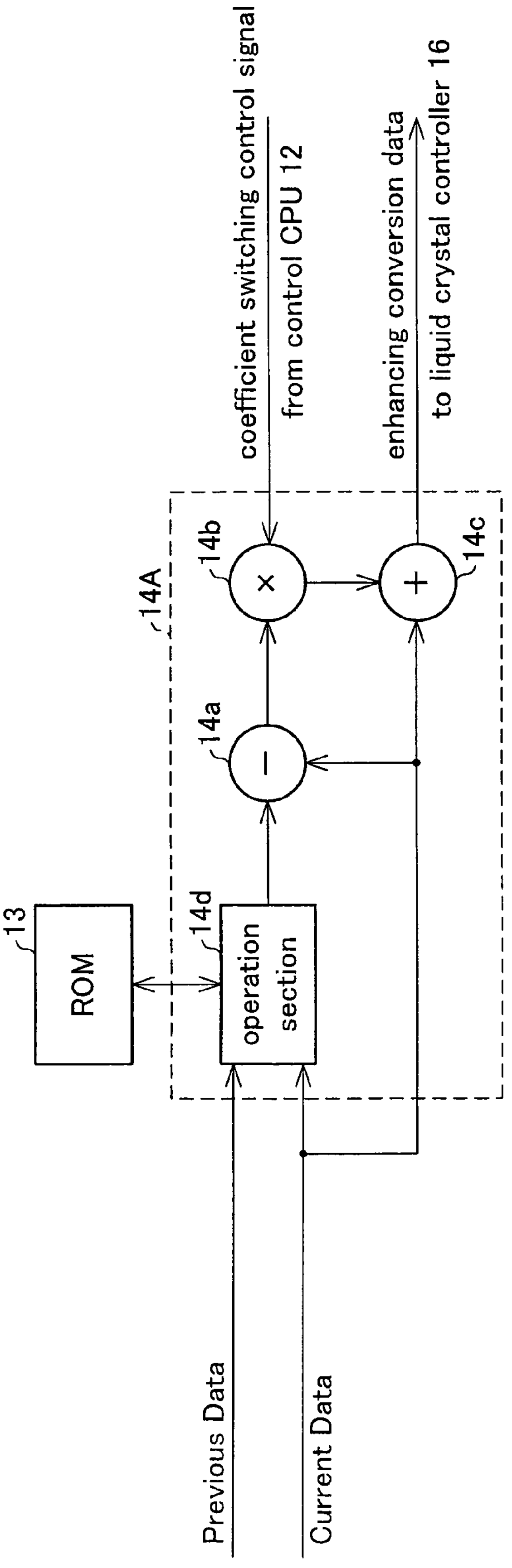
FIG. 2 illustrates a case where enhancing conversion data supplied to a liquid crystal display panel is calculated from an OS parameter obtained with reference to an OS table memory (ROM) shown in FIG. 1 and a multiplication coefficient obtained in accordance with signal type data.
Figure 15:
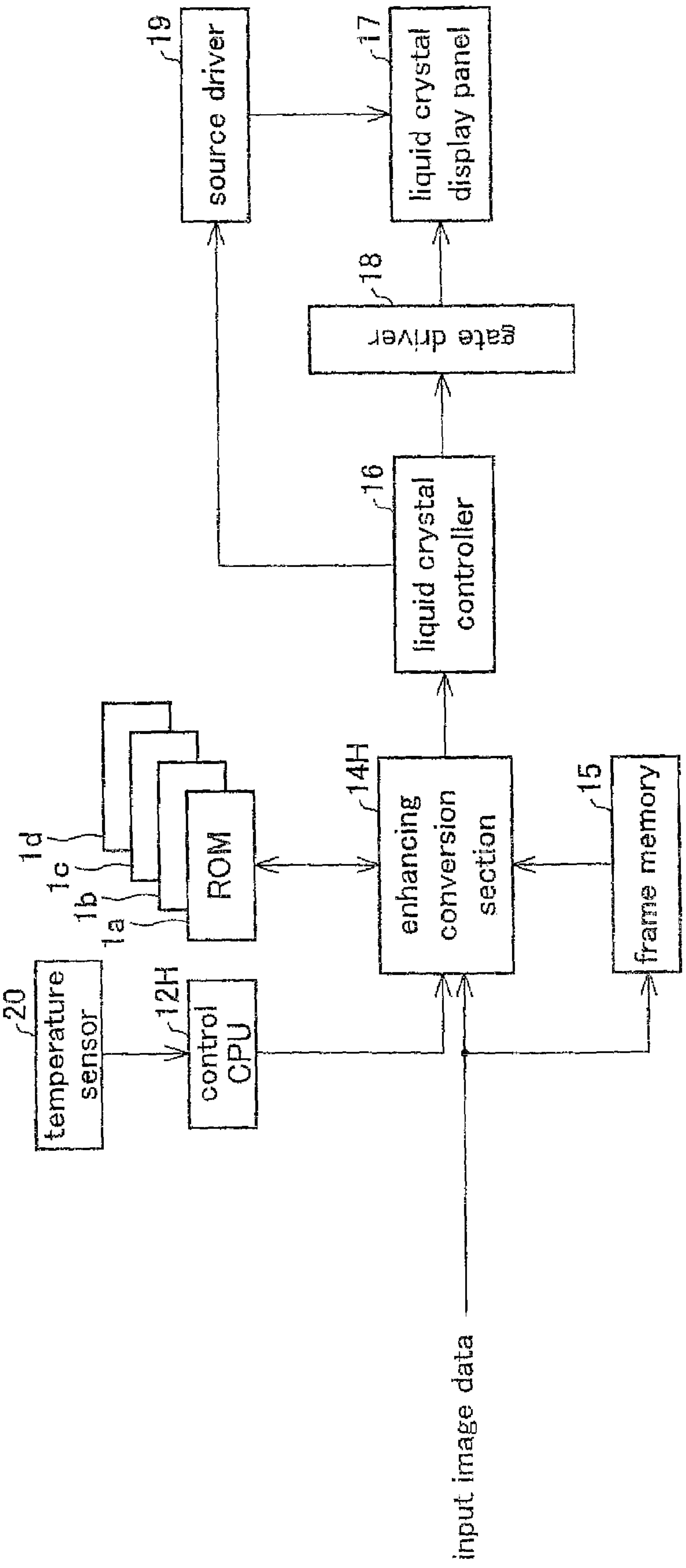
F I G. 1 5 PRIOR ART
FIG. 15 illustrates an example of a conventional liquid crystal display apparatus.
Figure 17:
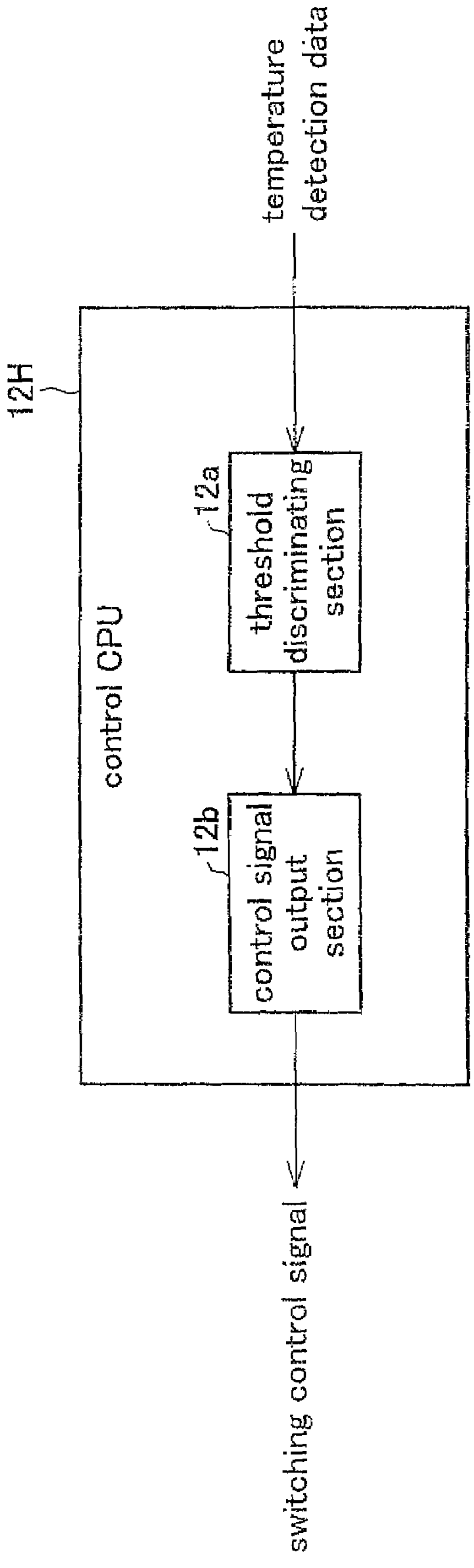
F I G. 1 7 PRIOR ART
FIG. 17 illustrates an example of the control CPU shown in FIG. 15.
Figure 18:
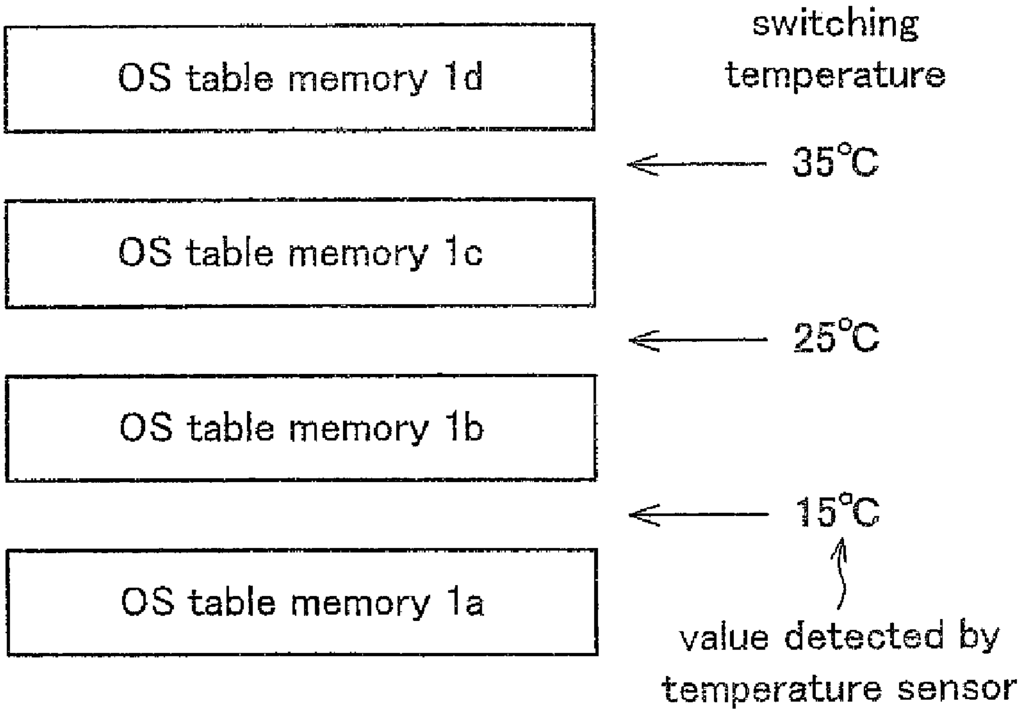
FIG. 18 PRIOR ART
FIG. 18 illustrates the operation of switching and selecting the OS table memories (ROMs) in FIG. 15, in accordance with a temperature in the apparatus.
Figure 19:
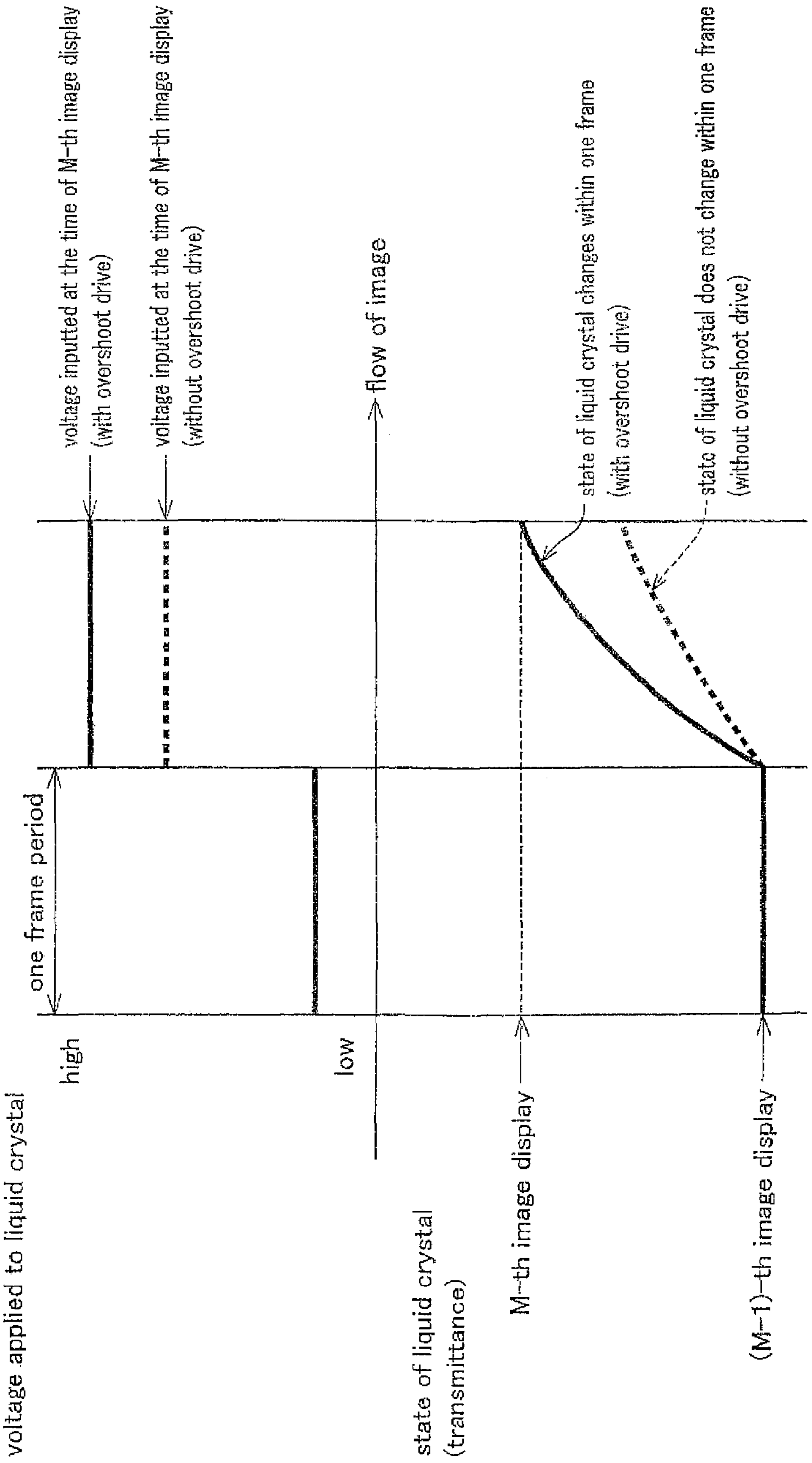
F I G. 1 9 PRIOR ART
FIG. 19 illustrate overshoot drive in the liquid crystal display apparatus in FIG. 15.

FIG. 1 illustrates Embodiment 1 of the liquid crystal display apparatus of the present invention, and FIG. 2 illustrates a case where enhancing conversion data supplied to a liquid crystal display panel is calculated from an OS parameter obtained with reference to an OS table memory (ROM) shown in FIG. 1 and a multiplication coefficient obtained in accordance with signal type data that varies according to the broadcasting standard (video format). Note that, in the figures described below, members having the same functions as those described in FIG. 15 are given the same numbers. In the following descriptions, furthermore, the enhancing conversions in enhancing conversion sections of respective Embodiments are different from each other. For this reason, in each Embodiment, the enhancing conversion section has one of the reference signs 14A through 14F. In a similar manner, control CPUs of respective Embodiments perform control in different ways, so that the control CPU in each Embodiment has one of the reference signs 12A through 12G.

The liquid crystal display apparatus of Embodiment 1 shown in FIG. 1 is arranged as follows: in order to improve the optical response speed of a liquid crystal display panel, image data is subjected to enhancing conversion. On the occasion of the enhancing conversion, the degree of the enhancing conversion with respect to the PAL/SECAM input image data is caused to be lower than the degree of the enhancing conversion with respect to the NTSC (60 Hz) input image data. The liquid crystal television receiver includes a video signal type detecting section 10, a control CPU 12A, an enhancing conversion section 14A, a frame memory 15, a liquid crystal controller 16, and a liquid crystal display panel 17.

As signal type detecting means, the video signal type detecting section 10 performs signal type detection so as to determine if the input image data is the NTSC (60 Hz) video signal or the PAL/SECAM (50 Hz) video signal.

In one example, the video signal type detecting section 10 is provided in a tuner/decoder section that receives television signals of the aforesaid broadcasting standards and decodes and converts the received television signals to input image data. The video signal type detecting section 10 can judge whether or not a video signal is of SECAM, by detecting if SECAM ID, which is included in a SECAM video signal, is included in a supplied video signal. In PAL, a phase of burst (R-Y) is inversed in each horizontal line. Meanwhile, in NTSC, a phase of burst (R-Y) is not inversed in each horizontal line. Taking into account of this, the video signal type detecting section 10 checks whether or not a phase of burst (R-Y) of a supplied video signal is inversed in each horizontal line, and judges that the video signal is PAL when the inversion occurs, or that the video signal is NTSC when the inversion does not occur. Also, there are two types of PAL video signals: a video signal with 3.58 MHz subcarrier and a video signal with 4.43 MHz subcarrier. The video signal type detecting section 10 can judge the type of a supplied PAL signal, with reference to a frequency of subcarrier of the signal. Meanwhile. since a frequency of subcarrier of a NTSC video signal is 3.58 MHz, the video signal type detection section 10 may perform the following judgments: whether or not a signal is a PAL video signal with 4.43 MHz subcarrier is judged with reference to a frequency of the subcarrier, and then whether the signal is a NTSC video signal or a PAL video signal with 3.58 MHz subcarrier is judged by checking whether or not a phase of burst (R-Y) is inverted in each horizontal line. Also, the video signal type detecting section 10 may detect a signal type in reference to, for instance, an identification signal of a broadcasting standard. It is noted that the video signal detecting section 10 is required to detect whether input image data is a video signal of first broadcasting standard or a video signal of second broadcasting standard whose vertical frequency is different from that of the first broadcasting standard. Therefore, for example, the signal type may be detected by directly detecting a frequency of a vertical synchronization signal of input image data.

The control CPU 12A as control means controls the enhancing conversion performed by the enhancing conversion section 14A, in accordance with the signal type detected by the video signal type detecting section 10.

The enhancing conversion section 14A as enhancing conversion means operates as follows: under the control by the control CPU 12A, the section 14A compares image data (image data of a current vertical period) of a current frame, which is to be displayed next, with image data (image data of the directly previous vertical period) of the directly previous frame, that has been stored in the frame memory 15. Then the section 14A reads out, from the OS table memory (ROM) 13, an OS parameter corresponding to a gray level transition pattern that is the result of the comparison. In accordance with this OS parameter having been read out, the section 14A generates enhancing conversion data (writing gray level data) that is required for reproducing an image of the current frame, and outputs the generated data to the liquid crystal controller 16.

In this case, as shown in FIG. 2, the enhancing conversion data supplied to the liquid crystal display panel 17 is obtained using the OS parameter with reference to the OS table memory (ROM) 13 and a multiplication coefficient obtained in accordance with the signal type (broadcasting format) of the input image data. That is to say, an operation section **14*d* compares input image data (current data) of M-th frame to be displayed next with input image data (previous data) of (M−1)-th frame, which has been stored in the frame memory 15. Then the OS parameter corresponding to the result of the comparison (i.e. gray level transition) is read out from the OS table memory (ROM) 13**, i.e. the OS parameter designated by the result of the comparison is read out. Consequently, enhancing operation data is outputted by performing an operation such as linear interpolation with respect to the OS parameter having been read out.

Subsequently, a subtracter **14*a* subtracts the aforesaid enhancing operation data from the image data of the current frame, so as to obtain difference data. Then a multiplier 14*b* multiplies the difference data by a multiplication coefficient a1 or β1 that can be switched by a coefficient switching control signal supplied from the control CPU 12A. This difference data having been multiplied by the multiplication coefficient is added to the image data of the current frame by an adder 14c, and as enhancing conversion data, the data after the addition is supplied to the liquid crystal controller 16**. Therefore, in response to input image data of a different signal type, a liquid crystal pixel is driven so as to obtain a transmittance specified by the input image data, within a predetermined period of time. It is noted that this predetermined period of time is a display period (pixel rewriting cycle) of an image for one frame. The predetermined period is one frame period (e.g. 16.7 msec in the case of 60 Hz progressive scanning, 20.0 msec in the case of 50 Hz progressive scanning) in typical hold drive. In a case of pseudo-impulse drive with which black display is performed for 50% of one frame period, a period of displaying an image is equivalent to a ½ frame period (e.g. 8.3 msec in the case of 60 Hz progressive scanning, 10.0 msec in the case of 50 Hz progressive scanning).

The multiplication coefficient when the input image data is a NTSC (60 Hz) video signal is $\alpha 1=1$, while the multiplication coefficient when the input image data is a PAL/SECAM (50 Hz) video signal is $\beta 1<1$. With this, when the input image data is a NTSC (60 Hz) video signal, the multiplication coefficient $\alpha 1$ (=1) is selected, and the enhancing conversion of the image data is performed in such a manner as to cause the transmittance of the liquid crystal pixel to become, within the predetermined period, equal to the transmittance specified by the input image data, so that a high-quality image without afterimage and trace is reproduced.

In the meanwhile, when the input image data is a PAL/SECAM (50 Hz) video signal, the multiplication coefficient $\beta 1$ (<1) is selected, so that the degree of the enhancing conversion is lowered. With this, although a frame cycle of a PAL/SECAM (50 Hz) video signal is longer than that of a NTSC (60 Hz) video signal, the enhancing conversion of image data is performed in such a manner as to cause a liquid crystal pixel to obtain, within a predetermined period of time, a transmittance specified by input image data. With this, a high-quality image without afterimage and trace is reproduced. In other words, it becomes possible to prevent an image noise not in conformity to input image data, which is caused by excessive response of liquid crystal on account of excessive enhancing conversion of image data.

Note that, when the number of sets of display data is 256 gray scales for 8 bits, the OS table memory (ROM) 13 may have OS parameter values (actual values) for all 256 gray levels. Apart from this, the following arrangement shown in FIG. 16 may be adopted: the OS table memory (ROM) 13 only stores 9×9 OS parameter values (actual values) each representing 32 gray levels, and the sets of enhancing conversion data for the remaining gray levels are calculated by performing, for instance, linear interpolation using the aforesaid actual values. This arrangement makes it possible to reduce the storage capacity of the OS table memory (ROM) 13.

The frame memory 15 can store image data for one frame. In this frame memory 15, image data of a frame immediately prior to the current frame is stored. The liquid crystal controller 16 drives the gate driver 18 and the source driver 19, in line with the enhancing conversion data supplied from the enhancing conversion section 14A, so as to cause the liquid crystal display panel 17 to display an image. The liquid crystal panel 17 includes TFTs (Thin Film Transistors) that are non-linear elements (switching elements), and displays an image on account of the drive of the gate driver 18 and the source driver 19.

The following will describe a liquid crystal display control method using the aforesaid enhancing conversion of the input image data of Embodiment 1.

When input image data is supplied, the video signal type detecting section 10 detects the type of this data: NTSC (60 Hz) video signal or PAL/SECAM (50 Hz) video signal.

When, for instance, a NTSC (60 Hz) video signal is detected, the video signal type detecting section 10 notifies the control CPU 12A of the detection of the NTSC (60 Hz) video signal.

On this occasion, the control CPU 12A instructs the enhancing conversion section 14A to perform the enhancing conversion with respect to the input image data. Subsequently, as described above, the operation section 14d compares input image data (current data) of M-th frame to be displayed next with input image data (previous data) of (M−1)-th frame, which has been stored in the frame memory 15. Then the OS parameter corresponding to the result of the comparison (i.e. gray level transition) is read out from the OS table memory (ROM) 13, so that the enhancing operation data is obtained. Note that, for NTSC image data, the enhancing operation data allows the liquid crystal display panel 17 to attain, within a predetermined period of time, a transmittance specified by the input image data of M-th frame to be displayed next. The subtracter 14a calculates the difference data indicating the difference between the aforesaid enhancing operation data and the input image data of the M-th frame to be displayed next.

Here, since the control CPU 12A selects the multiplication coefficient $\alpha 1$ (=1) corresponding to the NTSC (60 Hz) video signal, the multiplier 14b multiplies the difference data by the multiplication coefficient $\alpha 1$ (=1), i.e. the difference data is outputted with no alteration, then the adder 14c adds the multiplied data to the input image data of the M-th frame to be displayed, and consequently, as enhancing conversion data, the data as a result of the addition is supplied to the liquid crystal controller 16. (On this account, the enhancing conversion data supplied to the liquid crystal display panel 17 in this case is equivalent to the enhancing operation data of the operation section 14d.) In this manner, when the input image data is a NTSC (60 Hz) video signal, the liquid crystal pixel is driven so as to obtain a transmittance specified by the input image data, within a predetermined period of time. Therefore, the optical response characteristics of the liquid crystal display panel 17 are corrected and a high-quality image without afterimage and trace is displayed.

In the meanwhile, if the video signal type detecting section 10 detects a PAL/SECAM (50 Hz) video signal, the control CPU 12A instructs the enhancing conversion section 14A to perform enhancing conversion with respect to PAL/SECAM (50 Hz) input image data. In this case, as described above, the operation section 14d compares input image data (Current data) of M-th frame to be displayed next with input image data (Previous data) of (M−1)-th frame, which has been stored in the frame memory 15. Then the OS parameter corresponding to the result of the comparison (i.e. gray level transition) is read out from the OS table memory (ROM) 13, i.e. the OS parameter designated by the result of the comparison is read out. Consequently, enhancing operation data is obtained. Note that, for NTSC image data, the enhancing operation data allows the liquid crystal display panel 17 to attain, within a predetermined period, the transmittance specified by the input image data of M-th frame to be displayed next. The subtracter 14a figures out the difference data indicating the difference between the enhancing operation data and the input image data of M-th frame.

Since, in the case above, the multiplication coefficient β1 (<1) for the PAL/SECAM (50 Hz) video signal is selected by the control CPU 12A, the multiplier 14*b* multiplies the aforesaid difference data by the multiplication coefficient β1 (i.e. the difference data is lowered and outputted), and the adder 14*c* adds the input image data of M-th frame to the data figured out by the multiplication. Consequently, as the enhancing conversion data, the data figured out by the addition is supplied to the liquid crystal controller 16. (On this account, the enhancing conversion data in this case, which is supplied to the liquid crystal display panel 17, has a degree of enhancing conversion lower than that of the enhancing operation data figured out by the operation section 14*d*.) In this manner, when the input image data is a PAL/SECAM (50 Hz) video signal, the liquid crystal pixel is driven so as to attain, within a predetermined period of time, the transmittance specified by input image data. On this account, the optical response characteristics of the liquid crystal display panel 17 are corrected so that the occurrence of afterimage and trace are restrained.

As described above, in Embodiment 1, when the video signal type detecting section 10 detects a NTSC (60 Hz) video signal, the enhancing conversion section 14A reads out, from the OS table memory (ROM) 13, an OS parameter corresponding to the result of comparison (gray level transition) between the input image data of the current frame and the input image data of the directly previous frame. The enhancing operation data is obtained in accordance with the OS parameter having been read out, and as the enhancing conversion data, the enhancing operation data is supplied to the liquid crystal controller 16. With the arrangement above, the liquid crystal pixel is driven so as to attain, within a predetermined period, the transmittance specified by the input image data. Consequently, a high-quality image without afterimage and trace can be displayed.

Meanwhile, when the video signal type detecting section 10 detects a PAL/SECAM (50 Hz) video signal, the enhancing conversion section 14A reads out, from the OS table memory (ROM) 13, an OS parameter corresponding to the result of comparison (gray level transition) between the input image data of the current frame and the input image data of the directly previous frame. The degree of the enhancing conversion is lowered as compared to the enhancing operation data obtained in accordance with the OS parameter having been read out, and the resultant enhancing conversion data is supplied to the liquid crystal controller 16. With the arrangement above, the occurrence of image noise on account of excessive enhancement of input image data is restrained, and a liquid crystal pixel is driven so as to attain, in a predetermined period of time, a transmittance specified by the input image data. Consequently, a high-quality image without afterimage and trace can be displayed.

The liquid crystal display apparatus of the present embodiment, in which image data of at least directly previous frame is compared with image data of a current frame, and image data supplied to a liquid crystal display panel is subjected to enhancing conversion so that optical response characteristics of the liquid crystal panel is corrected, comprises signal type detecting means that detects whether a signal type of input image data is first broadcasting standard (video format) or second broadcasting standard (video format), and enhancing conversion means that performs enhancing conversion with respect to the image data in such a manner as to cause the liquid crystal display panel to attain a transmittance specified by the image data, the degree of enhancing conversion with respect to the image data by the enhancing conversion means being controlled and varied in accordance with the result of the detection by the signal type detecting means.

On this account, it is always possible to calculate suitable enhancing conversion data with respect to input image data under different broadcasting standards (video formats), and to supply the enhancing conversion data to the liquid crystal display panel. In addition, it is possible to perform high-quality image display, irrespective of which broadcasting standard the image data is based on. It is noted that any types of liquid crystal television receivers can be adopted, on condition that image display is performed using a liquid crystal display panel. Also, the liquid crystal display apparatus can be applied not only to household apparatuses such as personal computers and TV receivers adopting the aforesaid display apparatus, but also to measuring instruments, medical equipments, industrial equipments, and the like.

Embodiment 2

Figure 3:
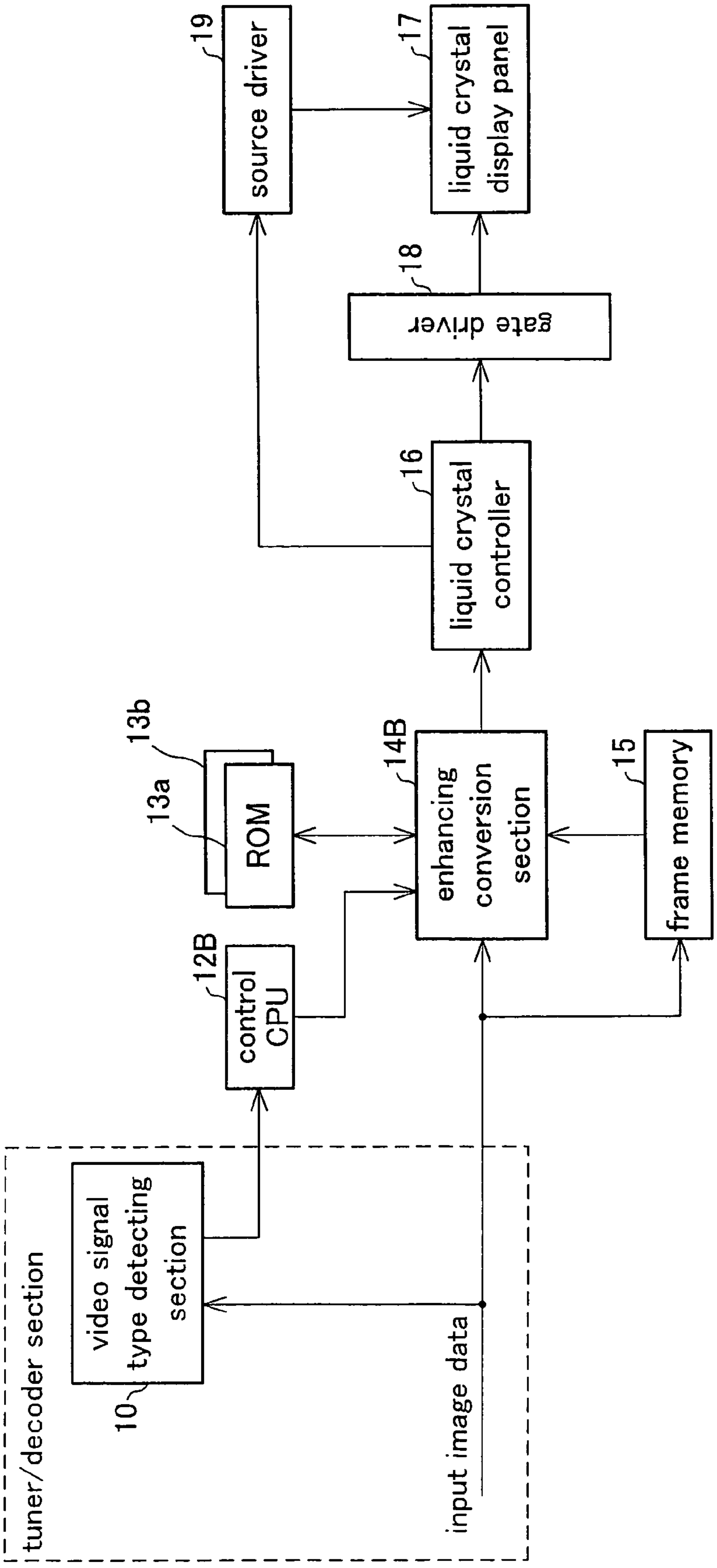
FIG. 3 illustrates Embodiment 2 where (i) an OS table memory (ROM) that is referred to when input image data is a NTSC (60 Hz) video signal and (ii) an OS table memory (ROM) that is referred to when input image data is a PAL/SECAM (50 Hz) signal are independent from each other.

FIG. 3 shows Embodiment 2, where (i) an OS table memory (ROM) storing an OS parameter for the enhancing conversion of the image data, when the input image data is a NTSC (60 Hz) video signal, and (ii) an OS table memory (ROM) storing an OS parameter for the enhancing conversion of the image data, when the input image data is a SECAM (50 Hz) video signal, are provided so as to be independent from each other. Note that, in the following description, members having the same functions as those described in FIG. 1 are given the same numbers and descriptions thereof are omitted in order to avoid overlap.

The liquid crystal display apparatus shown in FIG. 3 includes: an OS table memory (ROM) 13*a* that is referred to when the input image data is a NTSC (60 Hz) video signal; and an OS table memory (ROM) 13*b* that is referred to when the input image data is a PAL/SECAM (50 Hz) signal. In accordance with the signal type (broadcasting format) of the input image data detected by the video signal type detecting section 10, the liquid crystal television receiver switches to and refers to either the OS table memory (ROM) 13*a* or the OS table memory (ROM) 13*b*, so as to perform the enhancing conversion of the image data.

The OS parameter in the OS table memory (ROM) 13*b* is lower than the OS parameter in the OS table memory (ROM) 13*a*. With this, image noise on account of excessive enhancing conversion is prevented, because, as described above, a frame period of a PAL/SECAM (50 Hz) signal is longer than that of a NTSC (60 Hz) video signal.

Note that, in the present case, the parameters are stored in the respective OS table memories (ROMs) 13*a* and 13*b* that are independent from each other. However, the following arrangement may be adopted: the OS parameters are stored in different table areas of one OS table memory (ROM), and in accordance with a switching control signal from the control CPU 12B, the table area to be referred to is suitably switched. With this, a suitable OS parameter is selected and the enhancing conversion data is figured out.

According to this arrangement, as described above, when, for instance, the video signal type detecting section 10 detects a NTSC (60 Hz) video signal, the video signal type detecting section 10 notifies the control CPU 12B of the detection of the NTSC (60 Hz) video signal.

On this occasion, the control CPU 12B instructs the enhancing conversion section 14B as the enhancing conversion means to perform the enhancing conversion of the input image data. In this case, the enhancing conversion section 14B reads out, from the OS table memory (ROM) 13*a* that is referred to when the input image data is a NTSC (60 Hz)

video signal, an OS parameter corresponding to the result of comparison between the input image data (current data) of M-th frame to be displayed next and the input image data (previous data) of (M−1)-th frame, which has been stored in the frame memory 15. (In other words, the enhancing conversion section 14B reads out an OS parameter designated by the result of the comparison.) Then a calculation such as linear interpolation is performed using the OS parameter having been read out, and consequently the enhancing conversion data supplied to the liquid crystal controller 16 is obtained. Note that, the aforesaid enhancing conversion data allows the liquid crystal display panel 17 to attain, within a predetermined period, the transmittance specified by the input image data of M-th frame to be displayed next.

With this, when the input image data is a NTSC (60 Hz) video signal, the liquid crystal pixel is driven so as to attain the transmittance specified by the input image data, within a predetermined period. The optical response characteristics of the liquid crystal display panel 17 are therefore corrected, so that a high-quality image with no afterimage and trace is reproduced.

In the meanwhile, when the video signal type detecting section 10 detects a PAL/SECAM (50 Hz) video signal, the control CPU 12B instructs the enhancing conversion section 14B to perform enhancing conversion with respect to PAL/SECAM (50 Hz) input image data. In this case, the enhancing conversion section 14B reads out, from the OS table memory (ROM) 13*b* that is referred to when input image data is a PAL/SECAM (50 Hz) video signal, an OS parameter corresponding to the result of comparison (gray level transition) between the input image data (Current Data) of M-th frame to be displayed next and the input image data (Previous Data) of (M−1)-th frame stored in the frame memory 15. In other words, the enhancing conversion section 14B reads out an OS parameter specified by the result of the aforesaid comparison. The enhancing conversion section 14B performs an operation such as linear interpolation using the OS parameter having been read out, so that enhancing conversion data supplied to the liquid crystal controller 16 is obtained. It is noted that a degree of enhancing conversion of this enhancing conversion data is smaller than that of enhancing conversion data figured out with reference to the OS table memory 13*a*, in a case where input image data is a NTSC video signal.

With this, even in a case where input image data is a PAL/SECAM (50 Hz) video signal, it is possible to correct the optical response characteristics of the liquid crystal display panel 17, to restrain the occurrence of afterimage and trace, and hence to restrain deterioration of image quality on account of conspicuity of enhanced image noise not in conformity to input image data. This makes it possible to perform high-quality image display.

In this manner, Embodiment 2 is arranged in the following way: The OS table memory (ROM) 13*a* storing the OS parameter used when the input image data is a NTSC (60 Hz) video signal and the OS table memory (ROM) 13*b* storing the OS parameter used when the input image data is a PAL/SECAM (50 Hz) video signal are provided. The OS parameter in the OS table memory (ROM) 13*b* is smaller than the OS parameter in the OS table memory 13*a*, and the enhancing conversion data is figured out using the OS parameter read out from either the OS table memory (ROM) 13*a* or the OS table memory (ROM) 13*b* corresponding to a signal type of the detected signal. Therefore, the image data is subjected to appropriate enhancing conversion corresponding to the signal type of the input image data.

Embodiment 3

Figure 4:
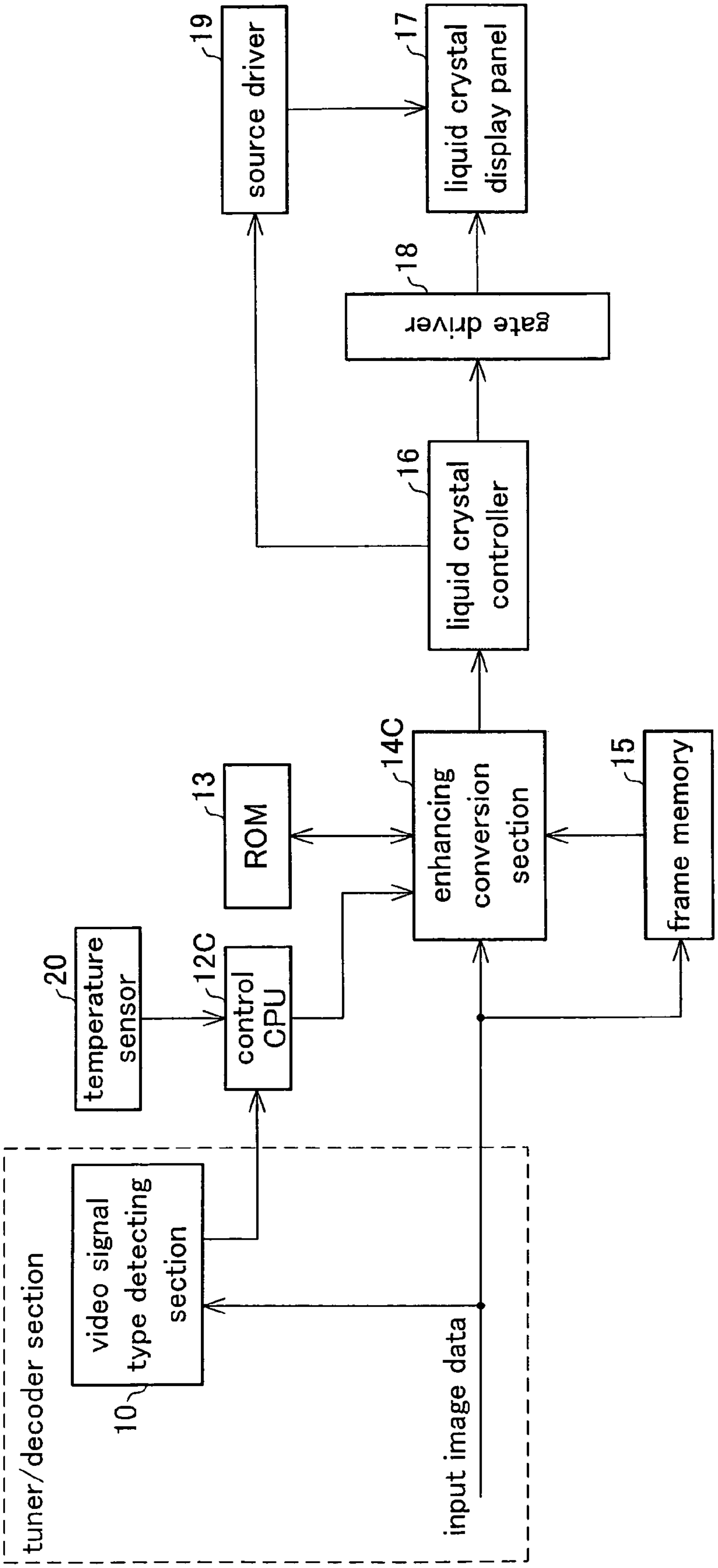
FIG. 4 illustrates Embodiment 3 where a temperature sensor is added to the arrangement shown in FIG. 1, and the enhancing conversion with respect to image data is performed using an OS parameter obtained with reference to the OS table memory (ROM) and using a multiplication coefficient corresponding to the signal type of input image data and a temperature in the apparatus.

FIG. 4 illustrates Embodiment 3 where a temperature sensor is added to the arrangement of FIG. 1, and the enhancing conversion with respect to the image data is performed with reference to the OS parameter obtained in reference to the OS table memory (ROM) 13 and the multiplication coefficient corresponding to the signal type (broadcasting format) of the input image data and a temperature in the apparatus.

In the liquid crystal display apparatus shown in FIG. 4, the OS table memory (ROM) 13 stores an OS parameter (enhancing conversion parameter) optimized for a case where the input image data is a NTSC (60 Hz) video signal, and the enhancing conversion with respect to the input image data is performed using the below-mentioned multiplication coefficients $\alpha1$-$\alpha4$ and $\beta1$-$\beta4$ corresponding to (i) signal type detection data obtained by the video signal type detecting section 10 as the signal type detection means and (ii) temperature detection data obtained by the temperature sensor 20 as the temperature detection means.

As described above, when the number of sets of display data is 256 gray scales for 8 bits, the OS table memory (ROM) 13 may have OS parameter values (actual values) for all 256 gray levels. Apart from this, the following arrangement shown in FIG. 16 may be adopted: the OS table memory (ROM) 13 only stores 9×9 OS parameter values (actual values) each representing 32 gray levels, and the sets of enhancing conversion data for the remaining gray levels are calculated by performing, for instance, linear interpolation using the aforesaid actual values. This arrangement makes it possible to reduce the storage capacity of the OS table memory (ROM) 13.

The enhancing conversion section 14C of the present embodiment is identical with the enhancing conversion section shown in FIG. 2, and can figure out the enhancing conversion data for compensating the optical response characteristics including the temperature dependency of the liquid crystal display panel 17, with reference to the OS parameter read out from the OS table memory (ROM) 13 and the multiplication coefficients $\alpha1$-$\alpha4$ and $\beta1$-$\beta4$ corresponding to the signal types and the temperatures in the liquid crystal display panel 17, and can supply the enhancing conversion data to the liquid crystal controller 16. Note that, the multiplication coefficients when the input image data is a NTSC (60 Hz) video signal are $\alpha1$-$\alpha4$, while the multiplication coefficients when the input image data is a PAL/SECAM (50 Hz) signal are $\beta1$-$\beta4$, where $\beta1<a1$, $\beta2<a2$, $\beta3<a3$, and $\beta4<a4$.

That is to say, in the following description, the temperature detection data supplied from the temperature sensor 20 is divided into four-stage temperature ranges, for instance, not higher than 15° C., higher than 15° C. and not higher than 25° C., higher than 25° C. and not higher than 35° C., and higher than 35° C. When the input image data is a NTSC (60 Hz) signal, the multiplication coefficient is $\alpha1$ ($>\alpha2$) when the temperature in the apparatus is not higher than 15° C., the multiplication coefficient is $\alpha2$ ($>\alpha3$) when the temperature is higher than 15° C. and not higher than 25° C., the multiplication coefficient is $\alpha3$ ($>\alpha4$) when the temperature is higher than 25° C. and not higher than 35° C., and the multiplication coefficient is $\alpha4$ ($=1$) when the temperature is higher than 35° C. Meanwhile, when the input image data is a PAL/SECAM (50 Hz) signal, the multiplication coefficient is $\beta1$ ($>\beta2$) when the temperature in the apparatus is not higher than 15° C., the multiplication coefficient is $\beta2$ ($>\beta3$) when the temperature is higher than 15° C. and not higher than 25° C., the multiplication coefficient is β3 (>β4) when the temperature is higher than 25° C. and not higher than 35° C., and the multiplication coefficient is β4 (<1) when the temperature is higher than 35° C. As a matter of course, the multiplication coefficients α1-α4 and β1-β4 may correspond to three or less stages of temperature ranges or five or more stages of temperature ranges.

Note that, these multiplication coefficients α1-α4 and β1-β4 are obtained in advance from the actual values of the optical response characteristics of the liquid crystal display panel 17. With the arrangement above, when the input image data is a PAL/SECAM (50 Hz) signal, the image data is subjected to the enhancing conversion whose degree is lower than the degree of the enhancing conversion in the case where the input image data is a NTSC (60 Hz) signal. Therefore, the optical response characteristics (including the temperature dependency) of the liquid crystal display panel 17 are corrected, while the deterioration of image quality due to an image noise on account of excessive enhancement is restrained, so that a high-quality image with no after image and trace is reproduced.

The temperature sensor 20 is preferably provided in the liquid crystal display panel 17, in consideration of the purpose thereof. However, since providing the temperature sensor 20 in the liquid crystal display panel is structurally difficult, it is preferable that the temperature sensor 20 be provided as close to the liquid crystal display panel 17 as possible. Also, the number of the temperature sensor 20 is not limited to one, and hence a plurality of temperature sensors 20 may be provided so as to correspond to the respective parts of the liquid crystal display panel 17. When a plurality of temperature sensors are provided, the temperature detection data may be figured out by averaging the detection results of the respective temperature sensors, or the detection result of one temperature sensor 20 that marked the most significant change may be chosen as the temperature detection data.

In the arrangement above, when the video signal type detecting section 10 detects, for instance, a NTSC (60 Hz) signal, the video signal type detecting section 10 notifies the control CPU 12C of the detection of the NTSC (60 Hz) signal.

On this occasion, the control CPU 12C instructs the enhancing conversion section 14C as the enhancing conversion means to perform the enhancing conversion with respect to the input image data. As described above, then the operation section 14*d* compares input image data (Current data) of M-th frame to be displayed next with input image data (Previous data) of (M−1)-th frame, which has been stored in the frame memory 15. Then the OS parameter corresponding to the result of the comparison (i.e. gray level transition) is read out from the OS table memory (ROM) 13, i.e. the OS parameter designated by the result of the comparison is read out, so that the enhancing operation data is obtained. Consequently, the subtracter 14*a* figures out the difference data indicating the difference between the aforesaid enhancing operation data and the input image data of M-th frame to be displayed next.

On this occasion, the control CPU 12C has stored (fetched, obtained) the temperature detection data supplied from the temperature sensor 20, and one of the multiple coefficients α1-α4, corresponding to the temperature detection data, is selected by the control CPU 12C. Here, the multiplication coefficient is α1 (>α2) when the temperature in the apparatus is not higher than 15° C., the multiplication coefficient is α2 (>α3) when the temperature is higher than 15° C. and not higher than 25° C., the multiplication coefficient is α3 (>α4) when the temperature is higher than 25° C. and not higher than 35° C., and the multiplication coefficient is α4 (=1) when the temperature is higher than 35° C.

When, by the control CPU 12C, one of these multiple coefficients α1-α4 is selected in accordance with the temperature detection data, the multiplier 14*b* multiplies the aforesaid difference data by one of the multiple coefficients α1-α4, the adder 14*c* adds the multiplied data to the input image data of M-th frame to be displayed next, and the data after the addition is supplied to the liquid crystal controller 16, as the enhancing conversion data. With this, when the input image data is a NTSC (60 Hz) video signal, the optical response characteristics (including the temperature dependency) of the liquid crystal display panel 17 are corrected even if the temperature of the liquid crystal display 17 panel varies, so that a high-quality image with no after image and trace is reproduced.

In the meanwhile, when the video signal type detecting section 10 detects a PAL/SECAM (50 Hz) video signal, the control CPU 12C instructs the enhancing conversion section 14C to perform the enhancing conversion with respect to the PAL/SECAM (50 Hz) input image data. In this case, as described above, the operation section 14*d* compares input image data (current data) of M-th frame to be displayed next with input image data (previous data) of (M−1)-th frame, which has been stored in the frame memory 15. Then the OS parameter corresponding to the result of the comparison (i.e. gray level transition) is read out from the OS table memory (ROM) 13, i.e. the OS parameter designated by the result of the comparison is read out, so that the enhancing operation data is obtained. Consequently, the subtracter 14*a* figures out the difference data indicating the difference between the aforesaid enhancing operation data and the input image data of M-th frame to be displayed next.

At this stage, the control CPU 12C has stored the temperature detection data supplied from the temperature sensor 20, so that the control CPU 12C selects one of the multiplication coefficients β1-β4, which corresponds to the temperature detection data. In this case, the multiplication coefficient is β1 (>β2) when the temperature in the apparatus is not higher than 15° C., the multiplication coefficient is β2 (>β3) when the temperature is higher than 15° C. and not higher than 25° C., the multiplication coefficient is β3 (>β4) when the temperature is higher than 25° C. and not higher than 35° C., and the multiplication coefficient is β4 (<1) when the temperature is higher than 35° C.

In accordance with the temperature detection data, the control CPU 12C selects one of these multiplication coefficients β1-β4. Subsequently, the multiplier 14*b* multiplies the aforesaid difference data by one of the multiplication coefficients β1-β4, the adder 14*c* adds the multiplied data to the input image data of M-th frame to be displayed next, and the data after the addition is supplied to the liquid crystal controller 16, as the enhancing conversion data.

If the input image data is a PAL/SECAM (50 Hz) video signal, β1<α1, β2<α2, β3<α3, and β4<α4. On this account, even if the temperature of the liquid crystal display panel 17 varies, the optical response characteristics (including the temperature dependency) of the liquid crystal display panel 17 are corrected, so that the occurrences of after image and trace are restrained, while the deterioration of image quality due to an image noise on account of excessive enhancing conversion of image data is restrained. On this account, a high-quality image display is realized.

In this manner, in Embodiment 3, the degree of the enhanced compensation with respect to the image data can be varied with reference to the multiplication coefficients α1-α4 when the input image data is a NTSC (60 Hz) video signal and the multiplication coefficients β1-β4 when the input image data is a PAL/SECAM (50 Hz) video signal, the multiplication coefficients α1-α4 and β1-β4 corresponding to the temperature detection data obtained by the temperature sensor 20. With this arrangement, the enhancing conversion corresponding to the signal type of the input image data and the temperature in the apparatus can be appropriately performed with respect to the image data, so that a high-quality image can be reproduced.

Embodiment 4

Figure 5:
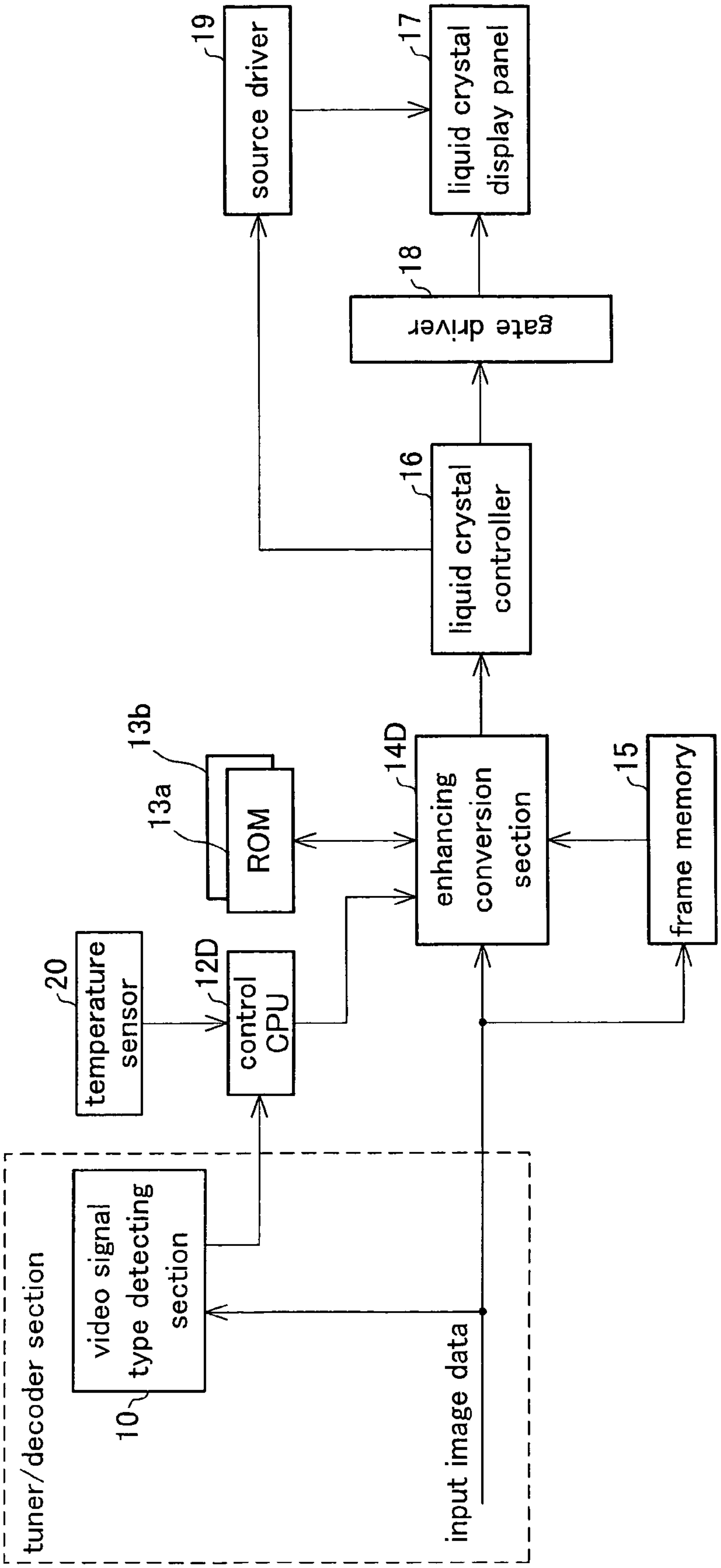
FIG. 5 illustrates Embodiment 4 where (i) an OS table memory (ROM) that is referred to when input image data is a NTSC (60 Hz) video signal and (ii) an OS table memory (ROM) that is referred to when input image data is a PAL/SECAM (50 Hz) signal are independent from each other, and the degree of enhancing conversion of image data is varied with reference to a multiplication coefficient corresponding to a temperature in the apparatus.
Figure 6:
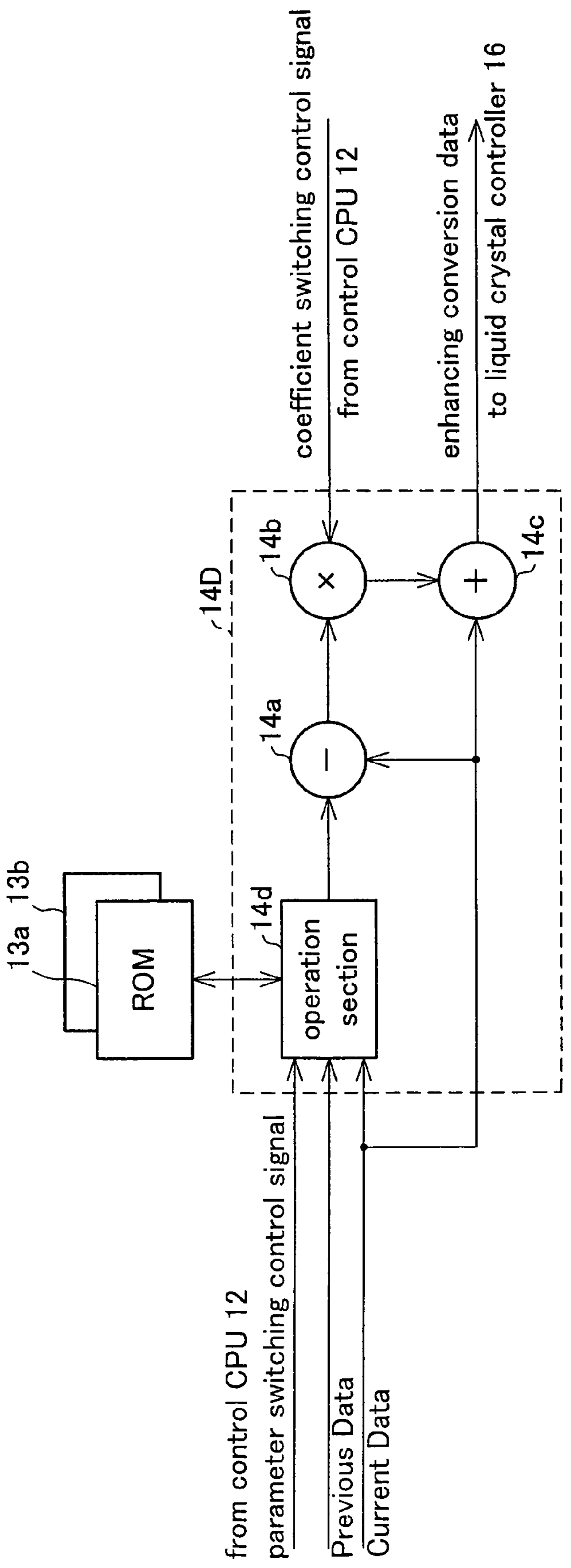
FIG. 6 illustrates a case where enhancing conversion data is calculated using (i) an OS parameter obtained with reference to the OS table memory (ROM) in FIG. 5 and (ii) a multiplication coefficient corresponding to temperature detection data obtained using a temperature sensor.

FIG. 5 illustrates Embodiment 4 arranged in such a manner that, an OS table memory (ROM) storing an OS parameter that is referred to a case where the input image data is a NTSC (60 Hz) video signal and that is used for the enhancing conversion of the image data and an OS table memory (ROM) storing an OS parameter that is referred to a case where the input image data is a PAL/SECAM (50 Hz) video signal and that is used for the enhancing conversion of the image data are provided so as to be independent from each other, these OS table memories functioning as the OS table memory (ROM) shown in FIG. 4, and the degree of the enhancing conversion is varied with reference to the multiplication coefficient corresponding to the temperature in the apparatus. FIG. 6 illustrates a case where the enhancing conversion data is figured out from the OS parameter obtained with reference to the OS table memories (ROMs) shown in FIG. 5 and the multiplication coefficient corresponding to the temperature detection data obtained using the temperature sensor.

The liquid crystal display apparatus shown in FIG. 5 includes: an OS table memory (ROM) 13*a* that is referred to when the input image data is a NTSC (60 Hz) video signal; and an OS table memory (ROM) 13*b* that is referred to when the input image data is a PAL/SECAM (50 Hz) video signal. This liquid crystal television receiver switches between and refers to one of the OS table memories (ROMs) 13*a* and 13*b*, in line with the NTSC (60 Hz) video signal or PAL/SECAM (50 Hz) video signal having been detected, and gives an instruction to perform the enhancing conversion of the input image data, with reference to the below-mentioned multiplication coefficients α1-α4 corresponding to the temperature detection data obtained by the temperature sensor 20.

The OS parameter in the OS table memory (ROM) 13*b* is smaller than the OS parameter in the OS table memory 13*a*, because, as described above, when the input image data is a PAL/SECAM (50 Hz) video signal, it is necessary to keep the degree of the enhancing conversion of the image data to be lower than that of a case where the input image data is a NTSC (60 Hz) video signal, in order to restrain the conspicuity of an enhanced false signal that occurs at the outline of the displayed image. This is because a frame cycle of the PAL/SECAM (50 Hz) video signal is longer than that of the NTSC (60 Hz) video signal.

In the present case, the OS parameters are stored in the respective OS table memories (ROMs) 13*a* and 13*b* that are independent from each other. There is, however, such an alternative arrangement that the OS parameters are stored in different table areas of one OS table memory (ROM), and an OS parameter is selected by suitably switching the table areas to be referred, in accordance with a switching control signal supplied from the control CPU 12D, and consequently the enhancing conversion data is obtained.

As described above, each of the OS table memories (ROMs) 13*a* and 13*b* may have OS parameter values (actual values) for all 256 gray levels, when the number of sets of display data is 256 gray scales for 8 bits. Apart from this, the following arrangement shown in FIG. 16 may be adopted: the OS table memory (ROM) 13 only stores 9×9 OS parameter values (actual values) each representing 32 gray levels, and the sets of enhancing conversion data for the remaining gray levels are calculated by performing, for instance, linear interpolation using the aforesaid actual values. This arrangement makes it possible to reduce the storage capacity of the OS table memory (ROM) 13.

The enhancing conversion section 14D of the present embodiment has a similar structure to the enhancing conversion section shown in FIG. 2. That is, using the OS parameter corresponding to the signal type (broadcasting format) and read out from either one of the OS table memories (ROMs) 13*a* and 13*b* and the multiplication coefficients α1-α4 corresponding to the temperatures of the liquid crystal display panel 17, the enhancing conversion section 14D can calculate the enhancing conversion data for correcting the optical response characteristics including the temperature dependency of the liquid crystal display panel 17, so as to output the enhancing conversion data to the liquid crystal controller 16.

That is to say, the following arrangement assumes as follows: the temperature detection data supplied from the temperature sensor 20 is divided into four-stage temperature ranges, for instance, not higher than 15° C., higher than 15° C. and not higher than 25° C., higher than 25° C. and not higher than 35° C., and higher than 35° C. The multiplication coefficient is a1 (>α2) when the temperature in the apparatus is not higher than 15° C., the multiplication coefficient is α2 (>α3) when the temperature is higher than 15° C. and not higher than 25° C., the multiplication coefficient is α3 (>α4) when the temperature is higher than 25° C. and not higher than 35° C., and the multiplication coefficient is α4 (=1) when the temperature is higher than 35° C. As a matter of course, the multiplication coefficients may correspond to three-stage temperature ranges or less and five-stage temperature ranges or more.

It is noted that these multiplication coefficients α1-α4 are obtained beforehand from the actual values of the optical response characteristics of the liquid crystal display panel 17. With the arrangement above, when the input image data is a PAL/SECAM (50 Hz) video signal, the image data is subjected to the enhancing conversion whose degree is lower than the degree of the enhancing conversion in the case where the input image data is a NTSC (60 Hz) video signal. Therefore, the optical response characteristics (including the temperature dependency) of the liquid crystal display panel 17 are corrected, while the deterioration of image quality due to an image noise on account of excessive enhancing conversion, and consequently a high-quality image without afterimage and trace is displayed.

The temperature sensor 20 is preferably provided in the liquid crystal display panel 17, in consideration of the purpose thereof. However, since providing the temperature sensor 20 in the liquid crystal display panel is structurally difficult, it is preferable that the temperature sensor 20 be provided as close to the liquid crystal display panel 17 as possible. Also, the number of the temperature sensor 20 is not limited to one, and hence a plurality of temperature sensors 20 may be provided so as to correspond to the respective parts of the liquid crystal display panel 17. When a plurality of temperature sensors 20 are provided, the temperature detection data may be figured out by averaging the detection results from the respective temperature sensors 20, or the detection result from one temperature sensor 20 that marked the most significant change may be chosen as the temperature detection data.

In this arrangement, as described above, when the video signal type detecting section 10 detects, for instance, a NTSC (60 Hz) video signal, the video signal type detecting section 10 notifies the control CPU 12D of the detection of the NTSC (60 Hz) video signal. On this occasion, the control CPU 12 instructs the enhancing conversion section 14D, which acts as the enhancing conversion means, to perform the enhancing conversion with respect to the input image data. More specifically, as shown in FIG. 6, the parameter switching control signal supplied from the control CPU 12D instructs to refer to the OS table memory (ROM) 13*a*. Subsequently, the operation section 14*d* reads out the OS parameter corresponding to the result of comparison (gray level transition) between the input image data (Current data) of M-th frame to be displayed next and the input image data (Previous data) of (M−1)-th frame, which is stored in the frame memory 15 (i.e. the operation section 14*d* reads out the OS parameter corresponding to the result of comparison), and consequently the enhancing operation data is obtained. Then the subtracter 14*a* calculates the difference data indicating the difference between the enhancing operation data and the input image data of M-th frame to be displayed.

At this stage, the control CPU 12D has obtained the temperature detection data from the temperature sensor 20. This control CPU 12D supplies, to the enhancing conversion section 14D, a coefficient switching control signal that is used for selecting one of the multiplication coefficients α1-α4, in accordance with the obtained temperature detection data. At this stage, the multiplication coefficient is α1 (>α2) when the temperature detection data indicates not higher than 15° C., the multiplication coefficient is α2 (>α3) when the temperature detection data indicates higher than 15° C. and not higher than 25° C., the multiplication coefficient is a3 (>α4) when the temperature detection data indicates higher than 25° C. and not higher than 35° C., and the multiplication coefficient is α4 (=1) when the temperature detection data indicates higher than 35° C.

In accordance with the temperature detection data, one of the multiplication coefficients α1-α4 is switched by the coefficient switching control signal supplied from the control CPU 12D. Upon this switching, the multiplier 14*b* multiplies the difference data by one of the multiplication coefficients α1-α4, the adder 14*c* adds the multiplied data to the input image data of the M-th frame to be displayed, and the added data is supplied to the liquid crystal controller 16, as the enhancing conversion data. With this, when the input image data is a NTSC (60 Hz) video signal, the optical response characteristics (including the temperature dependency) of the liquid crystal display panel 17 are corrected even if the temperature of the liquid crystal display panel 17 varies, so that a high-quality image with no after image and trace is reproduced.

On the other hand, when the video signal type detecting section 10 detects a PAL/SECAM (50 Hz) video signal, the control CPU 12D instructs the enhancing conversion section 14D to perform the enhancing conversion of the PAL/SECAM (0 Hz) input image data. In this case, the parameter switching control signal supplied from the control CPU 12D instructs to refer to the OS table memory (ROM) 13*b*. Then the operation section 14*d* reads out, from the OS table memory (ROM) 13*b*, the OS parameter corresponding to the result of comparison (gray level transition) between the input image data (Current data) of M-th frame to be displayed next and the input image data (Previous data) of (M−1)-th frame, which is stored in the frame memory 15 (i.e. the operation section 14*d* reads out the OS parameter corresponding to the result of the comparison), and consequently the enhancing operation data is obtained. Subsequently, the subtracter 14 calculates the difference data indicating the difference between this enhancing operation data and the input image data of the M-th frame to be displayed next.

At this stage, the control CPU 12D has obtained the temperature detection data from the temperature sensor 20. This control CPU 12D supplies, to the enhancing conversion section 14D, a coefficient switching control signal that is used for selecting one of the multiplication coefficients α1-α4, in accordance with the obtained temperature detection data. At this time, the multiplication coefficient is α1 (>α2) when the temperature detection data indicates not higher than 15° C., the multiplication coefficient is α2 (>α3) when the temperature detection data indicates higher than 15° C. and not higher than 25° C., the multiplication coefficient is a3 (>α4) when the temperature detection data indicates higher than 25° C. and not higher than 35° C., and the multiplication coefficient is α4 (=1) when the temperature detection data indicates higher than 35° C.

In accordance with the temperature detection data, one of the multiplication coefficients α1-α4 is switched by the coefficient switching control signal supplied from the control CPU 12D. Upon this switching, the multiplier 14*b* multiplies the difference data by one of the multiplication coefficients α1-α4, the adder 14*c* adds the multiplied data to the input image data of the M-th frame to be displayed, and the added data is supplied to the liquid crystal controller 16, as the enhancing conversion data.

At this stage, when the input image data is a PAL/SECAM (50 Hz) video signal, as described above, the OS parameter in the OS table memory (ROM) 13*b* is smaller than the OS parameter in the OS table memory (ROM) 13*a*. For this reason, even if the temperature of the liquid crystal display panel 17 varies, the optical response characteristics (including the temperature dependency) of the liquid crystal display panel 17 are corrected so that the occurrences of afterimage and trace are restrained, while the deterioration of image quality due to an image noise on account of excessive enhancing conversion of image data is restrained, and consequently a high-quality image is displayed.

In this manner, in Embodiment 4: the OS table memory (ROM) 13*a* referred to when the input image data is the NTSC (60 Hz) video signal and the OS table memory (ROM) 13*b* referred to when the input image data is the PAL/SECAM (50 Hz) video signal are provided; the OS parameter is read out, in accordance with the detected NTSC (60 Hz) video signal or PAL/SECAM (50 Hz) video signal, from one of the OS table memories (ROMs) 13*a* and 13*b*; and the degree of the enhancing conversion with respect to the input image data is varied with reference to the multiplication coefficients α1-α4, the multiplication coefficients α1-α4 corresponding to the temperature detection data obtained by the temperature sensor 20. With this, the enhancing conversion corresponding to the signal type of the input image data and the temperature in the apparatus can be appropriately performed with respect to the image data, so that a high-quality image can be reproduced.

Embodiment 5

Figure 7:
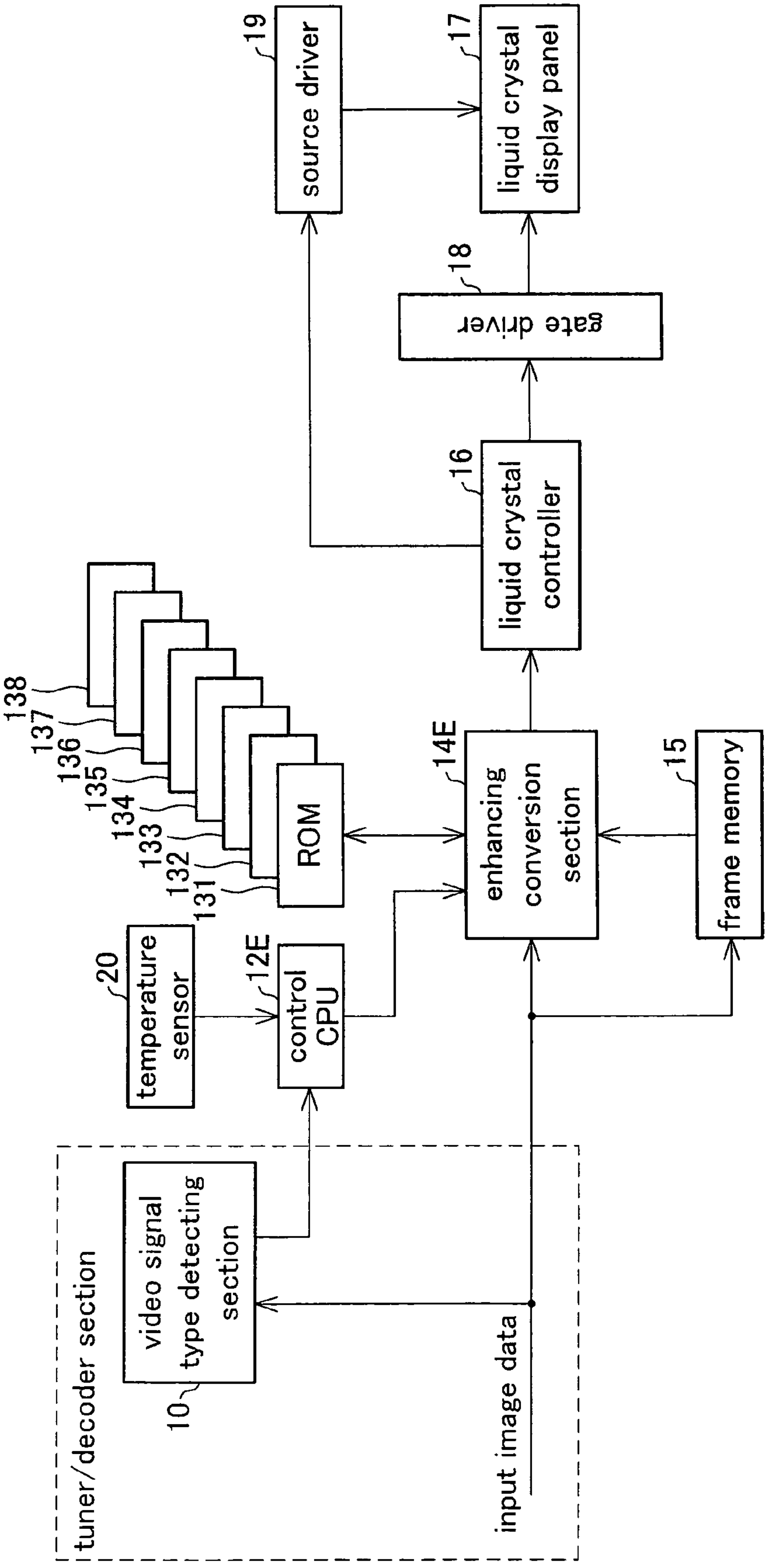
FIG. 7 illustrates Embodiment 5 where (i) OS table memories (ROMs) storing OS parameters that are referred to when input image data is a NTSC (60 Hz) video signal and that correspond to respective temperature ranges and (ii) OS table memories (ROMs) storing OS parameters that are referred to when input image data is a PAL/SECAM (50 Hz) signal and that correspond to respective temperature ranges are provided so as to be independent from each other.
Figure 8:
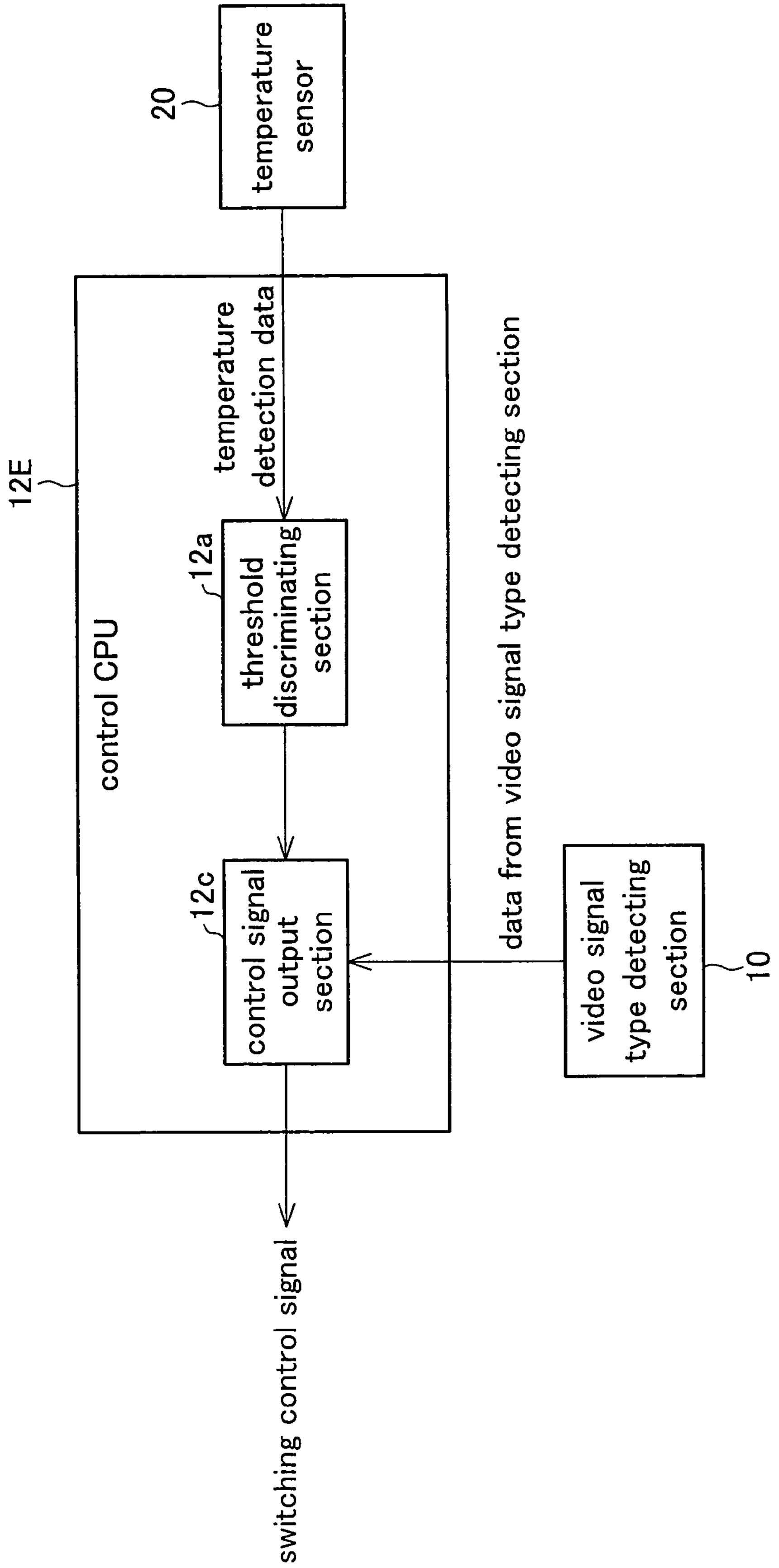
FIG. 8 illustrates the control CPU in FIG. 7 in detail.
Figure 9:
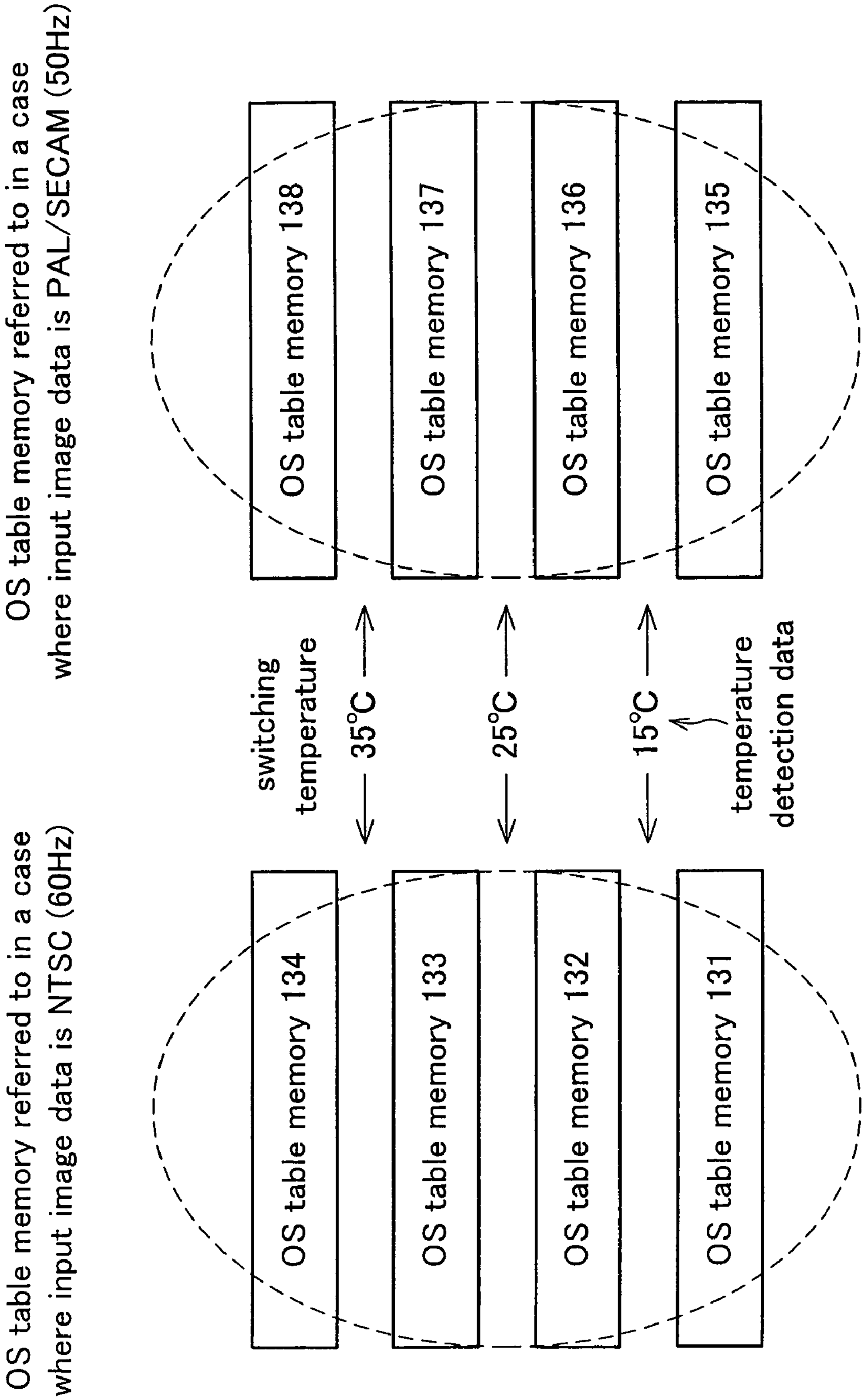
FIG. 9 illustrates the operation of switching and selecting the OS table memories (ROMs) in FIG. 7, in accordance with the signal type of the input image data and a temperature in the apparatus.

FIG. 7 illustrates Embodiment 5 in which (i) OS table memories (ROMs) that are referred to when the input image data is a NTSC (60 Hz) video signal and store OS parameters corresponding to respective temperature ranges and (ii) OS table memories (ROMs) that are referred to when the input image data is a PAL/SECAM (50 Hz) video signal and store OS parameters corresponding to respective temperature ranges are provided, the OS table memories (i) being independent from the OS table memories (ii). FIG. 8 describes the control CPU in FIG. 7 in detail. FIG. 9 illustrates how the OS table memories (ROMs) shown in FIG. 7 are switched and selected in accordance with the signal type (broadcasting format) of the input image data and the temperature in the apparatus.

As shown in FIG. 7, in Embodiment 5, there are OS table memories (ROMs) 131-134 that are referred to when the input image data is a NTSC (60 Hz) video signal and OS table memories (ROMs) 135-138 that are referred to when the input image data is a PAL/SECAM (50 Hz) video signal. The enhancing conversion of the image data is performed in such a manner that the signal type of the input image data, either the NTSC (60 Hz) video signal or the PAL/SECAM (50 Hz) video signal, is detected, and in accordance with this detected signal type and the temperature in the apparatus informed as the temperature detection data supplied from the temperature sensor 20, one of the OS table memories (ROMs) 131-138 is selected and referred to.

The OS parameters in the OS table memories (ROMs) 135-138 referred to when the input image data is the PAL/SECAM (50 Hz) video signal are smaller than the OS parameters in the OS table memories (ROMs) 131-134 referred to when the input image data is the NTSC (60 Hz) video signal. This is because, as described above, when the input image data is a PAL/SECAM (50 Hz) video signal, it is necessary to keep the degree of the enhancing conversion of the image data to be lower than that of a case where the input image data is a NTSC (60 Hz) video signal, in order to restrain the occurrence of image noise on account of excessive enhancing conversion. This is because a frame cycle of the PAL/SECAM (50 Hz) video signal is longer than that of the NTSC (60 Hz) video signal.

In the present case, the OS parameters are stored in the respective OS table memories (ROMs) 131-138 that are independent from each other. There is, however, such an alternative arrangement that the OS parameters are stored in different table areas of one OS table memory (ROM), and an OS parameter is selected by suitably switching the table areas to be referred, in accordance with a switching control signal supplied from the control CPU 12E, and consequently the enhancing conversion data is obtained.

As described above, each of the OS table memories (ROMs) 131-138 may have OS parameter values (actual values) for all 256 gray levels, when the number of sets of display data is 256 gray scales for 8 bits. Apart from this, the following arrangement shown in FIG. 16 may be adopted: the OS table memory (ROM) only stores 9×9 OS parameter values (actual values) each representing 32 gray levels, and the sets of enhancing conversion data for the remaining gray levels are calculated by performing, for instance, linear interpolation using the aforesaid actual values. This arrangement makes it possible to reduce the storage capacity of each of the OS table memories (ROMs) 131-138.

The temperature sensor 20 is preferably provided in the liquid crystal display panel 17, in consideration of the purpose thereof. However, since providing the temperature sensor 20 in the liquid crystal display panel is structurally difficult, it is preferable that the temperature sensor 20 be provided as close to the liquid crystal display panel 17 as possible. Also, the number of the temperature sensor 20 is not limited to one, and hence a plurality of temperature sensors 20 may be provided so as to correspond to the respective parts of the liquid crystal display panel 17. When a plurality of temperature sensors 20 are provided, the temperature detection data may be figured out by averaging the detection results from the respective temperature sensors 20, or the detection result from one temperature sensor 20 that marked the most significant change may be chosen as the temperature detection data.

As shown in FIG. 9, the OS table memories (ROMs) 131-138 are switched and referred to in accordance with the temperature detection data supplied from the temperature sensor 20. In the present case, the OS table memories (ROMs) 131-138 are provided so as to correspond to the following four ranges of the temperature in the apparatus: not more than 15° C.; more than 15° C. and not more than 25° C.; more than 25° C. and not more than 35° C.; and more than 35° C. As a matter of course, three-stage temperature ranges or less and five-stage temperature ranges or more may be provided.

FIG. 8 illustrates a control CPU 12E that instructs, in accordance with the temperature detection data supplied from the aforesaid temperature sensor 20, the switching and selection of the OS table memories (ROMs) 131-138. The control CPU 12E as control means includes a threshold discriminating section 12*a* and a control signal output section 12*c*.

Upon receiving the temperature detection data from the temperature sensor 20, the threshold discriminating section 12*a* compares this temperature detection data with, for instance, predetermined switching temperatures (threshold temperatures) Th1, Th2, and Th3. The switching temperatures Th1, Th2, and Th3 in this case are, for instance, 15° C., 25° C., and 35° C., and the result of the discrimination (the temperature in the apparatus is not less than 15° C. or not, more than 15° C. and not more than 25° C. or not, more than 25° C. and not more than 35° C. or not, or more than 35° C. or not) is outputted.

The control signal output section 12*c* outputs a switching control signal that corresponds to (i) the signal type (NTSC (60 Hz) video signal or PAL/SECAM (50 Hz) video signal) detected by the video signal type detecting section 10 and (ii) the result of the discrimination by the threshold discriminating section 12*a*. That is to say, upon receiving the result of the detection of the signal type from the video signal type detecting section 10 and the result of the discrimination from the threshold discriminating section 12*a*, the control signal output section 12*c* instructs, by the switching control signal, which one of the OS table memories (ROMs) 131-138 is referred to, in accordance with the signal type and the temperature detection data.

In this case, the control signal output section 12*c* performs the instruction, using two types of identification data. One of these two types of identification data is, for instance, "0" when the input image data is a NTSC (60 Hz) video signal and "1" when the input image data is a PAL/SECAM (50 Hz) video signal. The other one of the types of identification data is, for instance, "00, when the temperature detection data supplied from the temperature sensor 20 indicates not more than 15° C., 01" when the temperature detection data indicates more than 15° C. and not more than 25° C., "10" when the temperature detection data indicates more than 25° C. and not more than 35° C., and "11" when the temperature detection data indicates more than 35° C. The aforesaid instruction by the 3-bit switching control signal instructs which one of 8 OS table memories (ROMs) 131-138 is referred to on the occasion of performing the enhancing conversion of the image data.

According to this arrangement, as described above, when the video signal type detecting section 10 detects, for instance, a NTSC (60 Hz) video signal, the video signal type detecting section 10 notifies the control CPU 12E of the detection of the NTSC (60 Hz) video signal. In this case, the control CPU 12E instructs the enhancing conversion section 14E, which is enhancing conversion means, to subject the input image data to the enhancing conversion. In this case, in accordance with the result of the discrimination (the temperature in the apparatus is not less than 15° C. or not, more than 15° C. and not more than 25° C. or not, more than 25° C. and not more than 35° C. or not, or more than 35° C. or not), the control signal output section 12*c* outputs the switching control signal in order to select one of the OS table memories (ROMs) 131-134 that is referred to when the input image data is a NTSC (60 Hz) video signal.

When the temperature detection data supplied from the temperature sensor 20 indicates not more than 15° C., the signal instructs that the OS table memory (ROM) 131 should be referred to. When the temperature detection data indicates more than 15° C. and not more than 25° C., the signal instructs that the OS table memory (ROM) 132 should be referred to. When the temperature detection data indicates more than 25° C. and not more than 35° C., the signal instructs that the OS table memory (ROM) 133 should be referred to. When the temperature detection data indicates more than 35° C., the signal instructs that the OS table memory (ROM) 134 should be referred to.

Upon receiving the aforesaid instruction, the enhancing conversion section 14E reads out, from the selected OS table memory (ROM) 131, 132, 133, or 134, the OS parameter corresponding to the result of comparison (gray level transition) between the input image data (Current data) of the M-th frame to be displayed next and the input image data (Previous data) of the (M−1)-th frame, which is stored in the frame memory 15 (i.e. the enhancing conversion section 14E reads out the OS parameter indicated by the result of the comparison). In accordance with this OS parameter, enhancing conversion data is worked out and supplied to the liquid crystal controller 16. With this, when the input image data is a NTSC (60 Hz) video signal, the optical response characteristics (including the temperature dependency) of the liquid crystal display panel 17 are corrected even if the temperature of the liquid crystal display panel 17 varies, so that a high-quality image with no after image and trace is reproduced.

On the other hand, if the video signal detecting section 10 detects a PAL/SECAM (50 Hz) video signal, the control CPU 12E subjects the input image data, which is the PAL/SECAM (50 Hz) video signal, to the enhanced conversion. In this case, as described above, in accordance with the result of the discrimination (the temperature in the apparatus is not less than 15° C. or not, more than 15° C. and not more than 25° C. or not, more than 25° C. and not more than 35° C. or not, or more than 35° C. or not), the control signal output section 12*c* outputs the switching control signal in order to select one of the OS table memories (ROMs) 135-138 that is referred to when the input image data is a PAL/SECAM (50 Hz) video signal.

When the temperature detection data supplied from the temperature sensor 20 indicates not more than 15° C., the signal instructs that the OS table memory (ROM) 135 should be referred to. When the temperature detection data indicates more than 15° C. and not more than 25° C., the signal instructs that the OS table memory (ROM) 136 should be referred to. When the temperature detection data indicates more than 25° C. and not more than 35° C., the signal instructs that the OS table memory (ROM) 137 should be referred to. When the temperature detection data indicates more than 35° C., the signal instructs that the OS table memory (ROM) 138 should be referred to.

The enhancing conversion section 14E reads out, from the selected OS table memory (ROM) 135, 136, 137, or 138, the OS parameter corresponding to the result of comparison (gray level transition) between the input image data (Current data) of the M-th frame to be displayed next and the input image data (Previous data) of the (M−1)-th frame, which is stored in the frame memory 15 (i.e. the enhancing conversion section 14E reads out the OS parameter indicated by the result of the comparison). In accordance with this OS parameter, enhancing conversion data is worked out and supplied to the liquid crystal controller 16.

At this stage, when the input image data is a PAL/SECAM (50 Hz) video signal, as described above, the OS parameters in the OS table memories (ROMs) 135-138 are smaller than the corresponding OS parameters in the OS table memories (ROMs) 131-134. For this reason, even if the temperature of the liquid crystal display panel varies, the optical response characteristics (including the temperature dependency) of the liquid crystal display panel 17 are corrected so that the occurrences of afterimage and trace are restrained, while the deterioration of image quality due to an image noise on account of excessive enhancing conversion of image data is restrained, and consequently a high-quality image is displayed.

In this manner, in Embodiment 5, there are OS table memories (ROMs) 131-134 that correspond to the temperature detection data supplied from the temperature sensor 20 and are referred to when the input image data is a NTSC (60 Hz) video signal and OS table memories (ROMs) 135-138 that correspond to the temperature detection data supplied from the temperature sensor 20 and are referred to when the input image data is a PAL/SECAM (50 Hz) video signal. In accordance with the signal type of the input image data (NTSC (60 Hz) video signal or PAL/SECAM (50 Hz) video signal) and the temperature in the apparatus informed as the temperature detection data supplied from the temperature sensor 20, one of the OS table memories (ROMs) 131-138 is selected and referred to. Referring the selected OS table memory, the enhancing conversion with respect to the image data is performed. This makes it possible to suitably subject the image data to the enhancing conversion corresponding to the signal type and the temperature in the apparatus, so that a high-quality image is reproduced.

Embodiment 6

Figure 10:
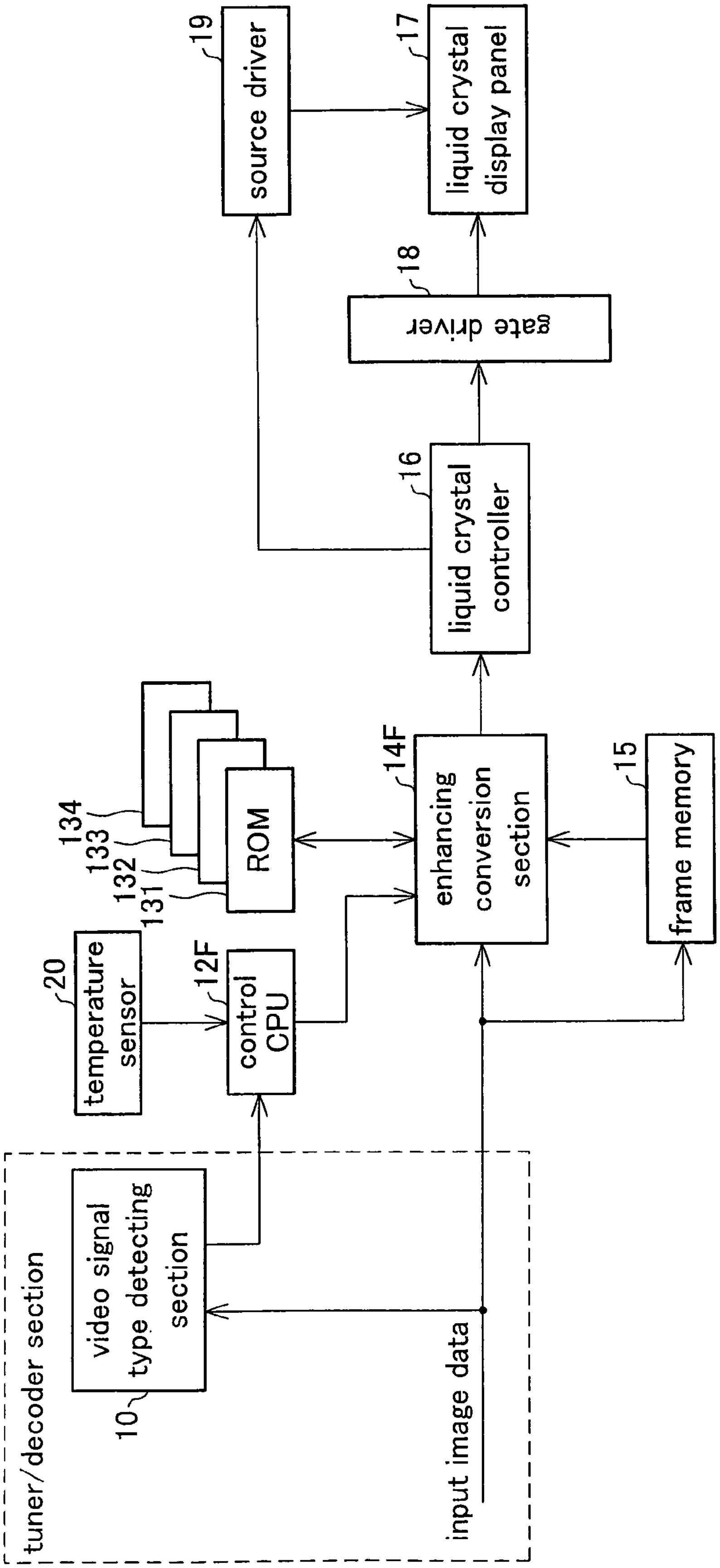
FIG. 10 illustrates Embodiment 6 where common OS parameters are used both when input image data is a NTSC (60 Hz) video signal and when input image data is a PAL/SECAM (50 Hz) signal.
Figure 11:
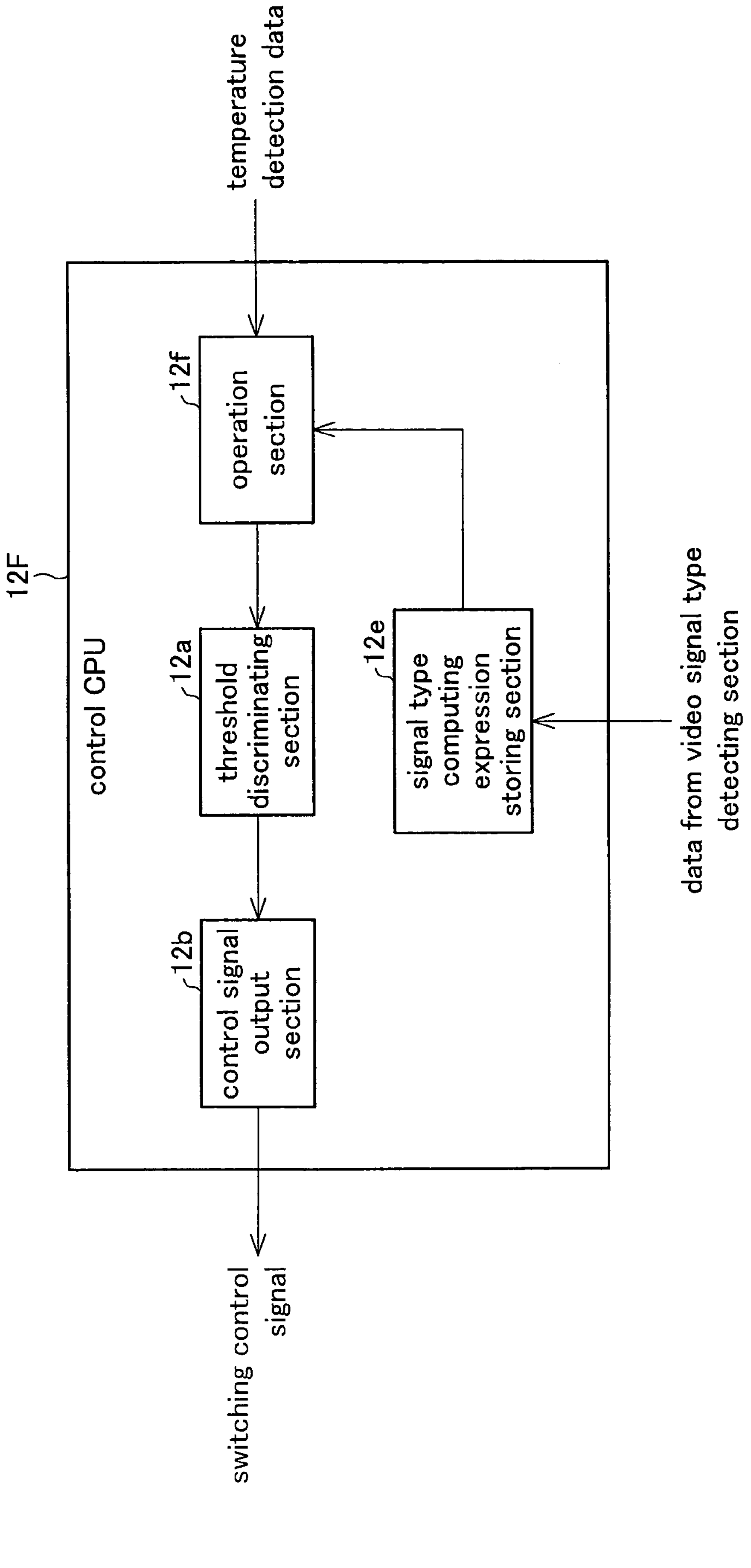
FIG. 11 illustrates the control CPU in FIG. 10 in detail.
Figure 12:
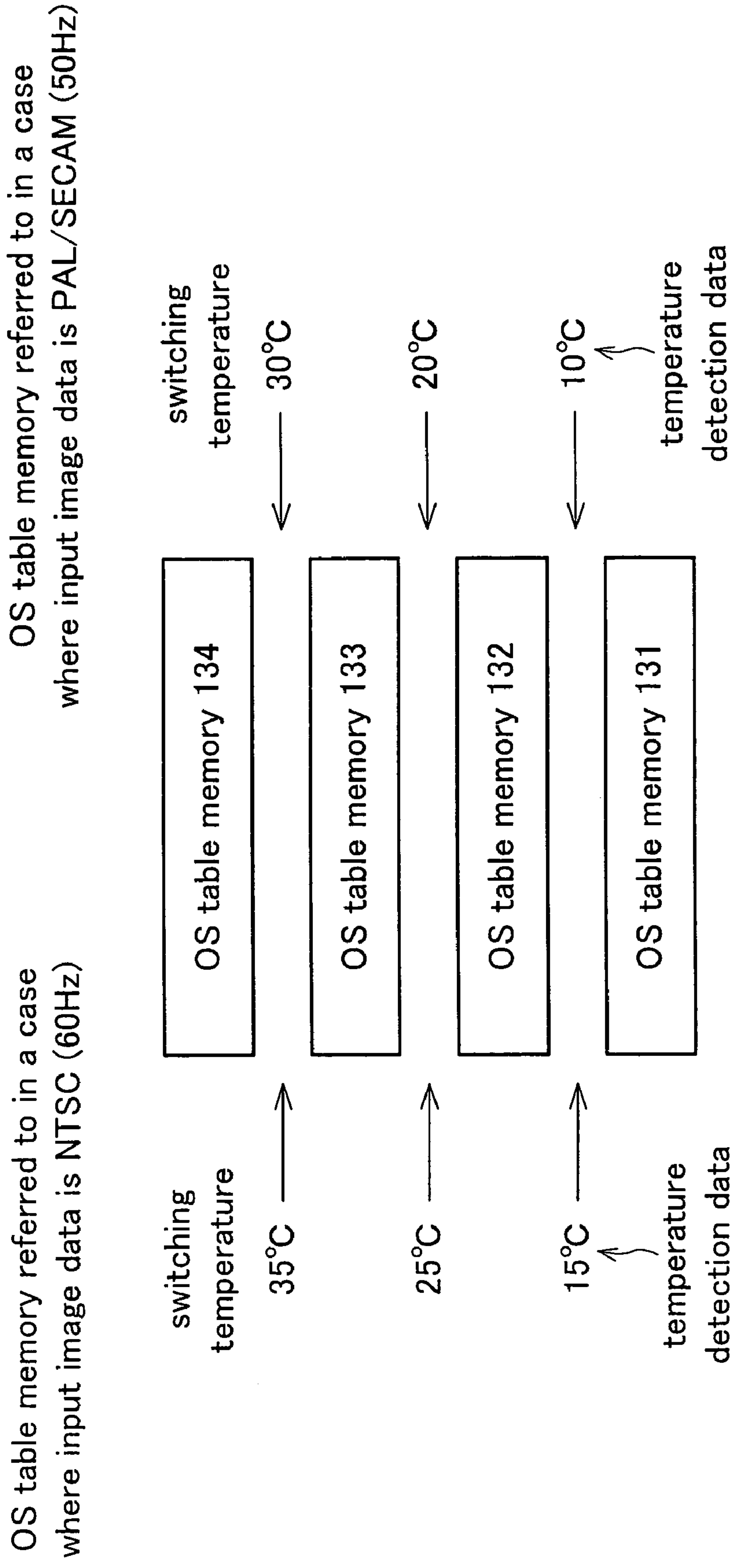
FIG. 12 illustrates the operation of switching and selecting the OS table memories (ROMs) in FIG. 10, in accordance with the signal type of the input image data and a temperature in the apparatus.

FIG. 10 shows Embodiment 6 in which the same OS parameters are used both when the input image data is a NTSC (60 Hz) video signal and when the input image data is a PAL/SECAM (50 Hz) video signal. FIG. 11 illustrates the control CPU of FIG. 11 in detail. FIG. 12 illustrates how the OS table memories (ROMs) shown in FIG. 10 are switched and selected in accordance with the signal type of the input image data and the temperature in the apparatus.

As shown in FIG. 10, Embodiment 6 is arranged as follows: 4 OS table memories (ROMs) 131-134 among the OS table memories (ROMs) 131-138 shown in FIG. 7 are referred to not only when the input image data is a NTSC (60 Hz) video signal but also when the input image data is a PAL/SECAM (50 Hz) video signal. In accordance with the signal type detected by the video signal type detecting section 10 and the temperature in the apparatus detected by the temperature sensor 20, one of the OS table memories (ROMs) 131-134 is chosen and referred to, so that the enhancing conversion with respect to the image data is performed.

In this manner, a control CPU 12F that switches and determines which one of the OS table memories (ROMs) 131-134 is referred to, in accordance with the signal type of the input image data and the result of the detection of the temperature in the apparatus, is arranged as shown in FIG. 11. That is to say, the control CPU 12F includes a threshold discriminating section 12_a_, a control signal output section 12_b_, a signal type computing expression storing section 12_e_, and an operation section 12_f_.

The threshold discrimination section 12_a_ compares temperature data, which has been calculated by the operation section 12_f_, with predetermined switching temperatures (threshold temperatures) Th1, Th2, and Th3. The switching temperatures Th1, Th2, and Th3 in this case are, for instance, 15° C., 25° C., and 35° C. In accordance with the result of the comparison by the threshold discriminating section 12_a_, the control signal output section 12_b_ generates a switching control signal in order to instruct the enhancing conversion section 14F (enhancing conversion means) to select and refer to one of the OS table memories (ROMs) 131-134.

The signal type computing expression storing section 12_e_ stores a computing expression that adds or subtracts, to/from the temperature detection data detected by the temperature sensor 20, predetermined values corresponding to the signal types of the input image data. By using the computing expression read out from the signal type computing expression storing section 12_e_, the operation section 12_f_ corrects the temperature detection data detected by the temperature sensor 20, in accordance with the signal type data detected by the video signal type detecting section 10.

According to this arrangement, as shown in FIG. 12, in a case where the input image data is a NTSC (60 Hz) video signal, the control CPU 12F instructs the enhancing conversion section 14F to select and refer to the OS table memory (ROM) 131, on condition that the temperature in the apparatus, which is detected by the temperature sensor 20, is not more than the switching temperature Th1 (=15° C.). With this, the enhancing conversion section 14F performs the enhancing conversion of the input image data, using the OS parameter stored in the OS table memory (ROM) 131.

If the temperature in the apparatus, which is detected by the temperature sensor 20, is more than the switching temperature Th1 (=15° C.) and not more than the switching temperature Th2 (=25° C.), the control CPU 12F instructs the enhancing conversion section 14F to select and refer to the OS table memory (ROM) 132. With this, the enhancing conversion section 14F performs the enhancing conversion of the input image data, using the OS parameter stored in the OS table memory (ROM) 132.

If the temperature in the apparatus, which is detected by the temperature sensor 20, is more than the switching temperature Th2 (=25° C.) and not more than the switching temperature Th3 (=35° C.), the control CPU 12F instructs the enhancing conversion section 14F to select and refer to the OS table memory (ROM) 133. With this, the enhancing conversion section 14F performs the enhancing conversion of the input image data, using the OS parameter stored in the OS table memory (ROM) 133.

If the temperature in the apparatus, which is detected by the temperature sensor 20, is more than the switching temperature Th3 (=35° C.), the control CPU 12F instructs the enhancing conversion section 14F to select and refer to the OS table memory (ROM) 134. With this, the enhancing conversion section 14F performs the enhancing conversion of the input image data, using the OS parameter stored in the OS table memory (ROM) 134.

On the other hand, as described above, when the input image data is a PAL/SECAM (50 Hz) signal, it is necessary to cause the degree of the enhancing conversion to be lower than that of a case where the input image data is a NTSC (60 Hz) signal, in order to prevent the image noise due to excessive enhanced conversion. On this account, in order to correct the degree of the aforesaid enhancing conversion, the operation section 12_f_ subjects the temperature detection data supplied from the temperature sensor 20 to a predetermined operation (adding a value corresponding to 5° C. in this case), using a computing expression read out from the signal type computing expression storing section 12_e_. Then the operation section 12_f_ outputs, to the threshold discriminating section 12_a_, the temperature detection data having been subjected to the operation. It is noted that the added value does not necessarily correspond to 5° C., and hence the value may correspond to a temperature not more than 4° C. or a temperature not less than 6° C., in accordance with the optical response characteristics of the liquid crystal display panel 17.

In this manner, when the input image data is a PAL/SECAM (50 Hz) video signal, the control CPU 12F instructs the enhancing conversion section 14F to select and refer to the OS table memory (ROM) 131, on condition that the temperature in the apparatus, which is detected by the temperature sensor 20, indicates not more than 10° C. With this, the enhancing conversion section 14F performs the enhancing conversion of the input image data, using the OS parameter stored in the OS table memory (ROM) 131.

If the temperature in the apparatus detected by the temperature sensor 20 is more than 10° C. and not more than 20° C., the control CPU 12F instructs the enhancing conversion section 14F to select and refer to the OS table memory (ROM) 132. With this, the enhancing conversion section 14F performs the enhancing conversion of the input image data, using the OS parameter stored in the OS table memory (ROM) 132.

If the temperature in the apparatus detected by the temp sensor 20 is more than 20° C. and not more than 30° C., the control CPU 12F instructs the enhancing conversion section 14F to select and refer to the OS table memory (ROM) 133. With this, the enhancing conversion section 14F performs the enhancing conversion of the input image data, using the OS parameter stored in the OS table memory (ROM) 133.

If the temperature in the apparatus detected by the temperature sensor 20 is more than 30° C., the control CPU 12F instructs the enhancing conversion section 14F to select and refer to the OS table memory (ROM) 134. With this, the enhancing conversion section 14F performs the enhancing conversion of the input image data, using the OS parameter stored in the OS table memory (ROM) 134.

In this manner, in Embodiment 6, the temperature detection data detected by the temperature sensor 20 is subjected to the predetermined operation, then the temperature detection data is compared with the predetermined switching temperatures Th1, Th2, and Th3, and consequently the switching control signal for switching the OS parameters is generated. That is to say, the switching temperature (temperature in the apparatus) for selecting one of the OS table memories (ROMs) 131-134 to be referred to is suitably determined both in the case where the input image data is a NTSC (60 Hz) video signal and in the case where the input image data is a PAL/SECAM (50 Hz) video signal. With this, the enhancing conversion can be performed with respect to any signal types of the input image data, by commonly using the OS table memories (ROMs) 131-134. On this account, the capacity of the memories can be restrained in comparison with the case where the OS table memory (ROM) is provided for each signal type of the input image data, i.e. provided for each of NTSC (60 Hz) video signal and PAL/SECAM (50 Hz) video signal.

When the input image data is a PAL/SECAM (50 Hz) video signal and the temperature conditions are identical with those of a case where the input image data is a NTSC (60 Hz) video signal, the enhancing conversion of the image data can be performed using an OS parameter that is smaller than the OS parameter used in the case where the input image data is a NTSC (60 Hz) video signal. On this account, it is possible to prevent the deterioration of image quality due to an image noise on account of excessive enhancing conversion of image data.

The OS parameters corresponding to the respective temperature ranges are stored in the respective OS table memories (ROMs) 131-134. There is, however, such an alternative arrangement that the OS parameters are stored in different table areas of one OS table memory (ROM), and an OS parameter is selected by suitably switching the table areas to be referred, in accordance with a switching control signal supplied from the control CPU 12F, and consequently the enhancing conversion data is obtained.

As described above, each of the OS table memories (ROMs) 131-134 may have OS parameter values (actual values) for all 256 gray levels, when the number of sets of display data is 256 gray scales for 8 bits. Apart from this, the following arrangement shown in FIG. 16 may be adopted: the OS table memory (ROM) only stores 9×9 OS parameter values (actual values) each representing 32 gray levels, and the sets of enhancing conversion data for the remaining gray levels are calculated by performing, for instance, linear interpolation using the aforesaid actual values. This arrangement makes it possible to reduce the storage capacity of each of the OS table memories (ROMs) 131-134.

Embodiment 7

Figure 13:
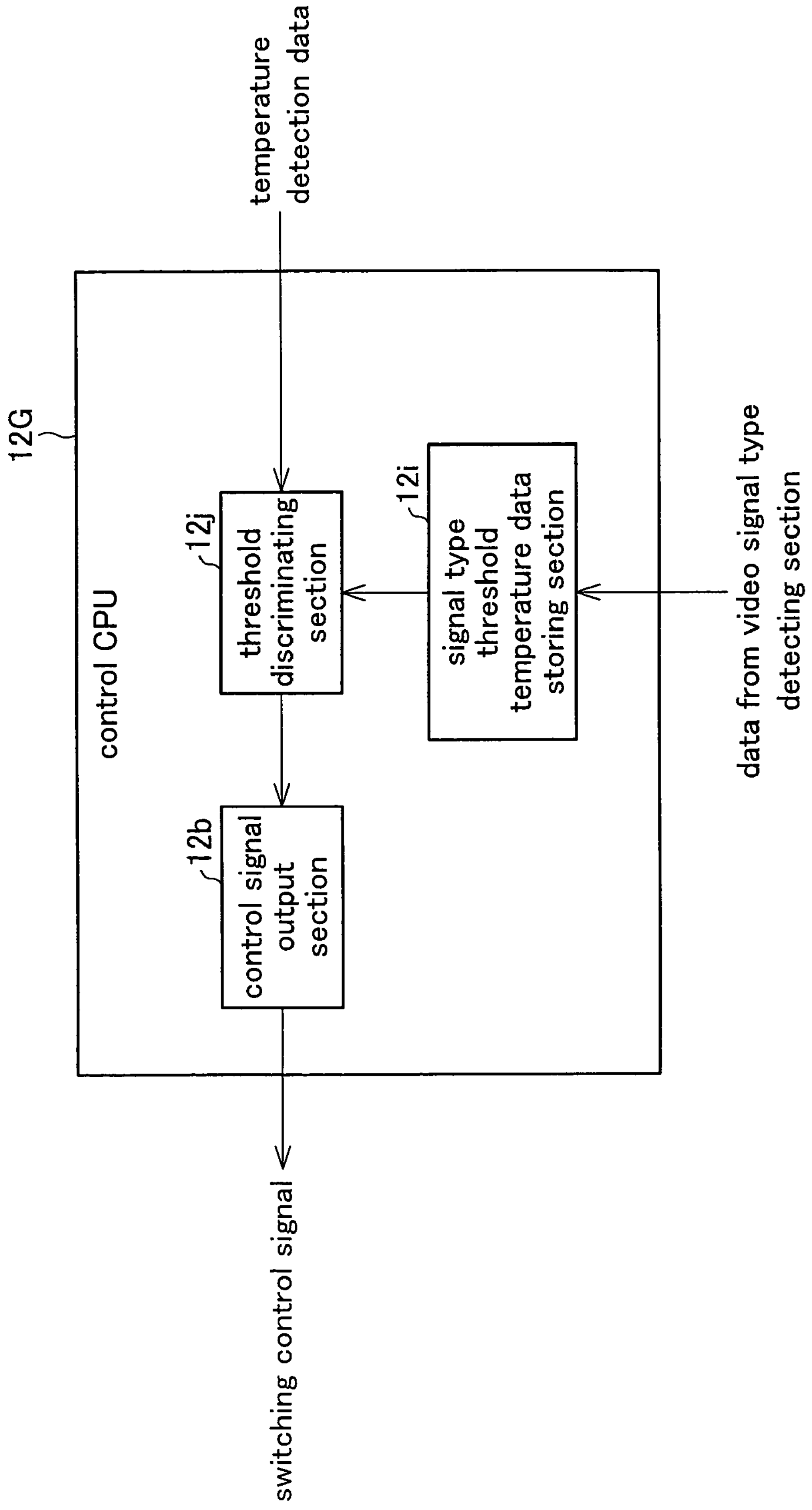
FIG. 13 illustrates Embodiment 7 where a control CPU different from that of FIG. 10 is provided.

FIG. 13 shows Embodiment 7 in which the control CPU shown in FIG. 10 is differently arranged.

The control CPU 12G of Embodiment 7 includes, as shown in FIG. 13, (i) a signal type threshold temperature data storing section 12*i* that stores sets of data of predetermined switching temperatures (threshold temperatures) corresponding to respective signal types of input image data, (ii) a threshold discriminating section 12*j* that compares, in accordance with the signal type of the input image data, the switching temperatures Th1, Th2, and Th3 read out from the signal type threshold temperature data storing section 12*i* with the temperature detection data detected by the temperature sensor 20, and (iii) a control signal output section 12*b* that generates a switching control signal for causing the enhancing conversion section 14F to select and refer to one of the OS table memories (ROMs) 131-134, in accordance with the result of the comparison by the threshold discriminating section 12*j*.

According to this arrangement, in a case where the input image data is a NTSC (60 Hz) video signal, if the temperature in the apparatus, which is detected by the temperature sensor 20, is not more than the switching temperature Th1 (=15° C.), the control CPU 12G instructs the enhancing conversion section 14F to select and refer to the OS table memory (ROM) 131. With this, the enhancing conversion section 14F performs the enhancing conversion of the input image data, using the OS parameter stored in the OS table memory (ROM) 131.

If the temperature in the apparatus, which is detected by the temperature sensor 20, is more than the switching temperature Th1 (=15° C.) and not more than the switching temperature Th2 (=25° C.), the control CPU 12G instructs the enhancing conversion section 14F to select and refer to the OS table memory (ROM) 132. With this, the enhancing conversion section 14F performs the enhancing conversion of the input image data, using the OS parameter stored in the OS table memory (ROM) 132.

If the temperature in the apparatus, which is detected by the temperature sensor 20, is more than the switching temperature Th1 (=25° C.) and not more than the switching temperature Th2 (=35° C.), the control CPU 12G instructs the enhancing conversion section 14F to select and refer to the OS table memory (ROM) 133. With this, the enhancing conversion section 14F performs the enhancing conversion of the input image data, using the OS parameter stored in the OS table memory (ROM) 133.

If the temperature in the apparatus, which is detected by the temperature sensor 20, is more than the switching temperature Th3 (=35° C.), the control CPU 12G instructs the enhancing conversion section 14F to select and refer to the OS table memory (ROM) 134. With this, the enhancing conversion section 14F performs the enhancing conversion of the input image data, using the OS parameter stored in the OS table memory (ROM) 134.

On the other hand, in a case where the input image data is a PAL/SECAM (50 Hz) video signal, as described above, it is necessary to cause the degree of the enhancing conversion to be lower than that of a case where the input image data is a NTSC (60 Hz) video signal, in order to prevent an image noise due to excessive enhancing conversion. On this account, in order to correct the degree of the aforesaid enhancing conversion, when the input image data is a PAL/SECAM (50 Hz) video signal, the threshold discriminating section 12*j* compares and discriminates the temperature detection data detected by the temperature sensor 20, using the switching temperatures Th'1 (<Th1), Th'2 (<Th2), and Th'3 (<Th3) read out from the signal type threshold temperature data storing section 12*j*. Then the threshold discriminating section 12 outputs, to the control signal output section 12*b*, the result of the comparison and discrimination.

With this, when the input image data is a PAL/SECAM (50 Hz) video signal, the control CPU 12G instructs the enhancing conversion section 14F to select and refer to the OS table memory (ROM) 131, on condition that the temperature in the apparatus, which is detected by the temperature sensor 20, is not more than the switching temperature Th' 1 (=10° C.). With this, the enhancing conversion section 14F performs the enhancing conversion of the input image data, using the OS parameter stored in the OS table memory (ROM) 131.

If the temperature in the apparatus is more than the switching temperature Th' 1 (=10° C.) and not more than the switching temperature Th' 2 (20° C.), the control CPU 12G instructs the enhancing conversion section 14F to select and refer to the OS table memory (ROM) 132. With this, the enhancing conversion section 14F performs the enhancing conversion of the input image data, using the OS parameter stored in the OS table memory (ROM) 132.

If the temperature in the apparatus is more than the switching temperature Th' 2 (=20° C.) and not more than the switching temperature Th' 3 (30° C.), the control CPU 12G instructs the enhancing conversion section 14F to select and refer to the OS table memory (ROM) 133. With this, the enhancing conversion section 14F performs the enhancing conversion of the input image data, using the OS parameter stored in the OS table memory (ROM) 133.

If the temperature in the apparatus is more than the switching temperature Th' 3 (=30° C.), the control CPU 12G instructs the enhancing conversion section 14F to select and refer to the OS table memory (ROM) 134. With this, the enhancing conversion section 14F performs the enhancing conversion of the input image data, using the OS parameter stored in the OS table memory (ROM) 134.

In this manner, in Embodiment 7, the temperature detection data generated by the temperature sensor 20 is compared and discriminated using the switching temperatures (threshold temperatures) corresponding to the respective signal types of the input image data, so that the switching control signal, by which the OS table memory (ROM) 131-134 to be referred is indicated, is generated. That is to say, the switching temperature (temperature in the apparatus) for selecting one of the OS table memories (ROMs) 131-134 to be referred to is suitably determined both in the case where the input image data is a NTSC (60 Hz) video signal and in the case where the input image data is a PAL/SECAM (50 Hz) video signal. With this, the enhancing conversion can be performed with respect to any types of the input image data, by commonly using the OS table memories (ROMs) 131-134. On this account, the capacity of the memories can be restrained in comparison with the case where the OS table memory (ROM) is provided for each signal type of the input image data, i.e. provided for each of NTSC (60 Hz) video signal and PAL/SECAM (50 Hz) video signal.

When the input image data is a PAL/SECAM (50 Hz) video signal and the temperature conditions are identical with those in a case where the input data is a NTSC (60 Hz) video signal, the enhancing conversion of the image data can be performed using an OS parameter that is smaller than the OS parameter used in the case where the input image data is a NTSC (60 Hz) video signal. On this account, it is possible to prevent the deterioration of image quality due to an image noise on account of excessive enhancing conversion of image data.

Embodiment 8

Figure 14:
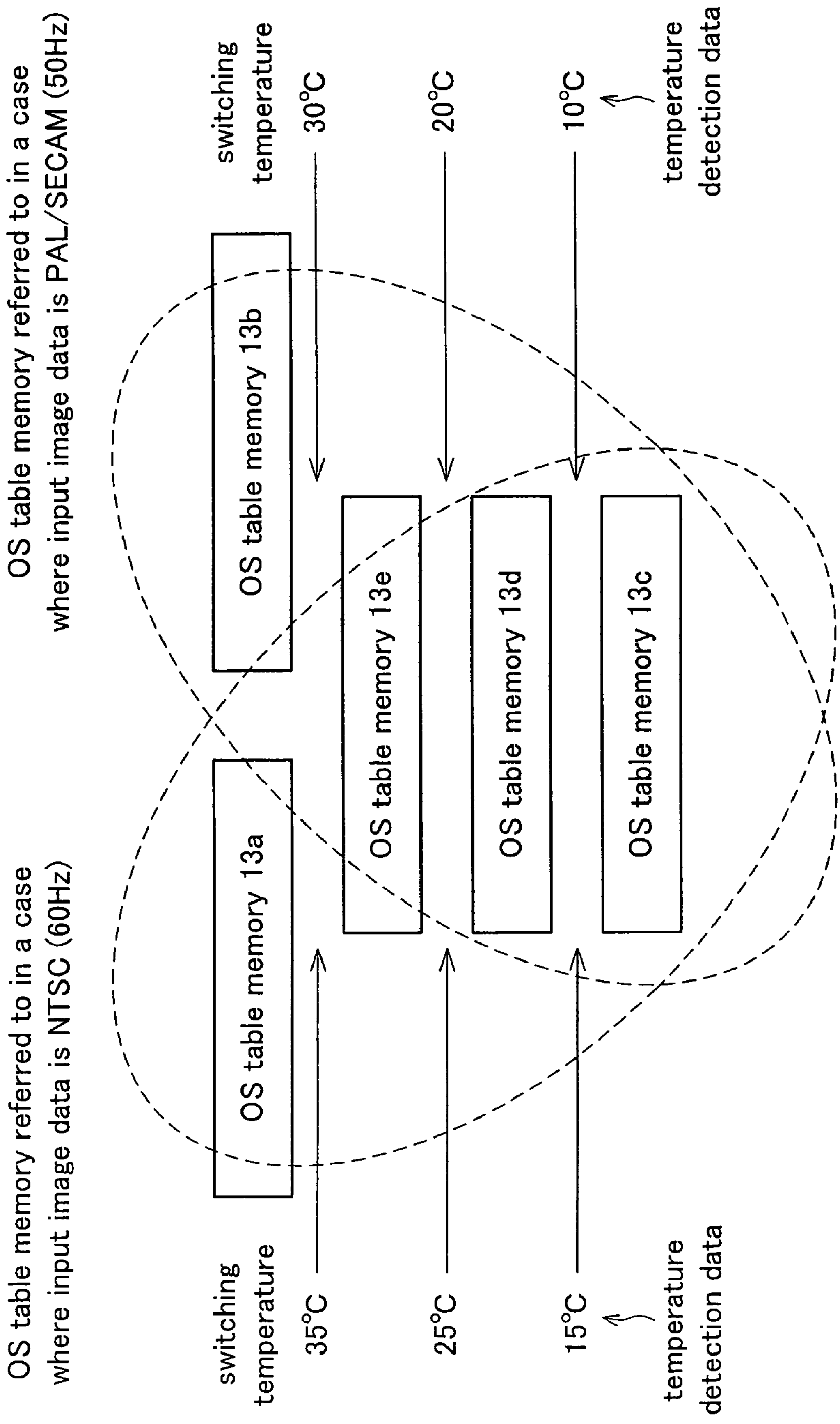
FIG. 14 illustrates Embodiment 8 where only some of OS parameters are shared between a case where input image data is a NTSC (60 Hz) video signal and a case where input image data is a PAL/SECAM (50 Hz) signal.

FIG. 14 shows Embodiment 8 where only some of the OS parameters are shared between a case where the input image data is a NTSC (60 Hz) video signal and a case where the input image data is a PAL/SECAM (50 Hz) video signal.

As shown in FIG. 14, Embodiment 8 is provided with (i) an OS table memory (ROM) 13*a* that is referred to when the input image data is a NTSC (60 Hz) video signal and an OS table memory (ROM) 13*b* that is referred to when the input image data is a PAL/SECAM (50 Hz) video signal, in addition to the OS table memories (ROMs) 13*c*-13*e* that are referred to irrespective of the signal type of the input image data, i.e. both in a case where the signal type is NTSC (60 Hz) and a case where the signal type is PAL/SECAM (50 Hz). In Embodiment 8, moreover, one of the OS table memories (ROMs) 13*a*-13*e* is selected and referred to in accordance with the switching temperature corresponding to each signal type, so that the enhancing conversion of the image data is performed.

Each of the dedicated OS table memories (ROMs) 13*a* and 13*b* stores an OS parameter used for the enhancing conversion of the image data, when, for instance, the temperature exceeds normal temperatures (temperatures suitable for use conditions). When the OS table memories (ROMs) 13*a*-13*e* are switched and referred to in accordance with the switching temperatures corresponding to the signal types, the switching and referring are performed using a switching control signal supplied from a control CPU 12F (or 12G) shown in FIG. 11 (or FIG. 13).

According to this arrangement, when the input image data is a NTSC (60 Hz) video signal, the control CPU 12F instructs the enhancing conversion section 14F to select and refer to the OS table memory (ROM) 13*c* on condition that the temperature in the apparatus, which is detected by the temperature sensor 20, is not more than 15° C. With this, the enhancing conversion section 14F performs the enhancing conversion of the input image data using the OS parameter stored in the OS table memory (ROM) 13*c*.

If the temperature in the apparatus is more than 15° C. and not more than 25° C., the control CPU 12F instructs the enhancing conversion section 14F to select and refer to the OS table memory (ROM) 13*d*. With this, the enhancing conversion section 14F performs the enhancing conversion of the input image data, using the OS parameter stored in the OS table memory (ROM) 13*d*.

If the temperature in the apparatus is more than 25° C. and not more than 35° C., the control CPU 12F instructs the enhancing conversion section 14F to select and refer to the OS table memory (ROM) 13*e*. With this, the enhancing conversion section 14F performs the enhancing conversion of the input image data, using the OS parameter stored in the OS table memory (ROM) 13*e*.

If the temperature in the apparatus is more than 35° C., the control CPU 12F instructs the enhancing conversion section 14F to select and refer to the OS table memory (ROM) 13*a*. With this, the enhancing conversion section 14F performs the enhancing conversion of the input image data, using the OS parameter stored in the OS table memory (ROM) 13*a*.

On the other hand, when the input image data is a PAL/SECAM (50 Hz) video signal, the control CPU 12F instructs the enhancing conversion section 14F to select and refer to the OS table memory (ROM) 13*c*, on condition that the temperature in the apparatus, which is detected by the temperature sensor 20, is mot more than 10° C. With this, the enhancing conversion section 14F performs the enhancing conversion of the input image data, using the OS parameter stored in the OS table memory (ROM) 13*c*.

If the temperature in the apparatus is more than 10° C. and not more than 20° C., the control CPU 12F instructs the enhancing conversion section 14F to select and refer to the OS table memory (ROM) 13*d*. With this, the enhancing conversion section 14F performs the enhancing conversion of the input image data, using the OS parameter stored in the OS table memory (ROM) 13*d*.

If the temperature in the apparatus is more than 20° C. and not more than 30° C., the control CPU 12F instructs the enhancing conversion section 14F to select and refer to the OS table memory (ROM) 13*e*. With this, the enhancing conversion section 14F performs the enhancing conversion of the input image data, using the OS parameter stored in the OS table memory (ROM) 13*e*.

If the temperature in the apparatus is more than 30° C., the control CPU 12F instructs the enhancing conversion section 14F to select and refer to the OS table memory (ROM) 13*b*. With this, the enhancing conversion section 14F performs the enhancing conversion of the input image data, using the OS parameter stored in the OS table memory (ROM) 13*b*.

In this manner, Embodiment 8 is provided with the dedicated OS table memory (ROM) 13*a* that is referred to when the input image data is a NTSC (60 Hz) video signal and the dedicated OS table memory (ROM) 13*b* that is referred to when the input image data is a PAL/SECAM (50 Hz) video signal, in addition to the OS table memories (ROMs) 13*c*-13*e* that are used both when the input image data is the NTSC (60 Hz) video signal and when the input image data is the PAL/SECAM (50 Hz) video signal. Also, in Embodiment 8, these OS table memories (ROMs) 13*a*-13*e* are switched and referred to in accordance with the switching temperatures (temperatures in the apparatus) corresponding to the respective signal types, so that the enhancing conversion is suitably performed by commonly using the OS table memories (ROMs) 13*c*-13*e*.

The OS parameters corresponding to the respective signal types and temperature ranges are stored in the respective OS table memories (ROMs) 13*a*-13*e*. There is, however, such an alternative arrangement that the OS parameters are stored in different table areas of one OS table memory (ROM), and an OS parameter is selected by suitably switching the table areas to be referred to, in accordance with a switching control signal supplied from the control CPU 12F (or 12G), and consequently the enhancing conversion data is obtained.

As described above, each of the OS table memories (ROMs) 13*a*-13*e* may have OS parameter values (actual values) for all 256 gray levels, when the number of sets of display data is 256 gray scales for 8 bits. Apart from this, the following arrangement shown in FIG. 16 may be adopted: the OS table memory (ROM) only stores 9×9 OS parameter values (actual values) each representing 32 gray levels, and the sets of enhancing conversion data for the remaining gray levels are calculated by performing, for instance, linear interpolation using the aforesaid actual values. This arrangement makes it possible to reduce the storage capacity of each of the OS table memories (ROMs) 13*a*-13*e*.

In the embodiments above, the video signal type detecting section 10 automatically detects a broadcasting standard (video format) of an input video signal. Not limited to this arrangement, the video signal type detecting section 10 may detect a broadcasting format of a video signal, in accordance with an instruction with regard to the selection of the video signal, which is supplied from the user through a remote controller or the like. In any cases, a similar effect is obtained on condition that a broadcasting standard (video format) of a video signal is detected. It is, however, noted that the automatic detection as in the foregoing embodiments impose a burden on the user, as compared to the arrangement where the user each time gives an instruction.

In the foregoing embodiments, a broadcasting standard of display on the liquid crystal television receiver is always changeable. Not limited to this arrangement, the broadcasting standard may be changeable only in a predetermined period, e.g. at the time of shipping. In such an arrangement, the broadcasting standard of display on the liquid crystal television receiver is changed within the aforesaid period. On this account, according to this arrangement, setting the broadcasting standard (video format) of display in the aforesaid period allows for a single liquid crystal television receiver to support different broadcasting standards. Also, setting the broadcasting standard in the aforesaid period realizes, when input image data with the broadcasting format thus set is inputted after the period, high-quality image display by performing enhancing conversion of input image data in such a way as to always causing the liquid crystal display panel to have a transmittance defined by the input image data in a predetermined period of time. In this manner, even if a period in which the broadcasting standard of display on the liquid crystal television receiver is limited, the liquid crystal television receiver can reproduced images based on image data of different broadcasting standards. Also, an effect similar to the above can be obtained by varying and controlling the degree of enhancing conversion with respect to the image data, in accordance with the broadcasting standard of the input image data (i.e. the input image data is whether a video signal of first broadcasting standard or a video signal of second broadcasting standard). Note that, however, a liquid crystal television receiver with a wide variety of functions is realized in a case where the broadcasting standard is always changeable as in the aforesaid embodiments.

In the foregoing embodiments, the liquid crystal television receiver is a multi-television receiver that can reproduce images from television broadcasting signals of different broadcasting standards. Alternatively, the video signals based on which the liquid crystal television receiver reproduces images may be a video signal supplied from a player capable of reproducing a television broadcasting signal recorded on a recording medium, or a video signal supplied from a player capable of reproducing a video signal from a player capable of reproducing a video signal that is of a video format identical with that of television broadcasting (e.g. DVD) and is recorded on a recording medium. In such cases, the following arrangement may be adopted: information indicating the broadcasting standard (video format) of a video signal is recorded on a recording medium, and the video signal type detecting section 10 detects the broadcasting standard (video format) of the video signal, based on the information read out from the recording medium. In any cases, an effect similar to the above is obtained irrespective of a signal source from which the video signal is outputted, on condition that the liquid crystal television receiver supports video signals of a plurality of video formats (broadcasting standards), and the degree of enhancing conversion with respect to image data can be varied and controlled in accordance with the broadcasting format of the input image data (i.e. whether the input image data is a video signal of first broadcasting standard or the input image data is a video signal of second broadcasting standard.

The above-described embodiments premise that the liquid crystal television receiver adopts such a driving method that the whole image for one frame of image data is written and scanned in one frame period of the image data. In other words, the liquid crystal television receiver adopts such a driving method that one vertical period (period for one frame) is identical with one vertical display period. The present invention, however, is not limited to this. For instance, the liquid crystal television receiver may adopt such a driving method that one frame period is divided into (i) a period (image display period) for displaying an image and (ii) a period (dark display period) for dark display (e.g. black display).

Also, the aforesaid embodiments premise that the enhancing conversion data, which corresponds to the combination of the input image data of a directly previous frame and the input image data of a current frame, is supplied to the liquid crystal controller 16. However, the present invention is not limited to this arrangement. For instance, the enhancing conversion data may be determined by referring to not only the input image data of the directly previous frame but also the input image data of a non-directly previous frame (e.g. input image data of two frames before). In any case, effects similar to the above can be obtained as long as the enhancing conversion data is determined at least with reference to the input image data of the directly previous frame. It is, however, noted that a frame memory with a larger memory capacity is required if the enhancing conversion data is determined with reference to the input image data of two or more frames before the current frame. On this account, when the memory capacity must be reduced, it is preferable, as in the foregoing embodiments, to determine the enhancing conversion data only with reference to the input image data of the directly previous frame and the input image data of the current frame, among the sets of the input image data of the respective frames.

Moreover, in the above-described embodiments, the enhancing conversion data is supplied to the liquid crystal controller 16, with reference to the input image data of the directly previous frame. However, instead of the input image data of the directly previous frame, which was actually inputted, image data generated in the following manner may be referred to: a gray level that the pixel of the liquid crystal panel actually has reached is estimated from the writing of the image data of the directly previous frame, and this estimated value is referred to as the aforesaid image data (Previous data) of the directly previous frame. Also in this case, the input image data of the directly previous frame is referred to in order to estimate the gray level. In any case, effects similar to the above can be obtained as long as the enhancing conversion data is determined at least in accordance with the input image data of the directly previous frame and the input image data of the current frame.

In the aforesaid embodiments, the enhancing conversion section (14A-14F) performs the enhancing conversion with reference to the OS parameter (enhancing conversion parameter) stored in the OS table memory (ROMs 13-13*e* and 131-138). The present invention, however, is not limited to this. For instance, the following arrangement may be adopted: the enhancing conversion section calculates enhancing conversion data for correcting the optical response characteristics of the liquid crystal panel (17), using a function such as a 2-D function f (Current Data, Previous Data) adopting, as variables, input image data (Current Data) of the M-th frame and input image data (Previous Data) of the (M−1)-th frame stored in the frame memory 15.

In the aforesaid embodiments, the video signal type detecting section (10), the control CPUs (12A-12G), the enhancing conversion sections (14A-14F), and the frame memory (15) are all hardware. Alternatively, these members may be realized by causing computing means such as a computer (CPU) to execute a program stored in a storage device (e.g. memory, not illustrated), so as to perform the operations similar to those of the aforesaid members. The program may be distributed in the form of a recording medium storing the program or through various types of (wireless or wired) transmission channels, and executed by the computer.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

INDUSTRIAL APPLICABILITY

The present invention can suitably be used for a liquid crystal television receiver that reproduces images using a liquid crystal display panel capable of reproducing images based on image data of each broadcasting standard, because the optical response characteristics of the liquid crystal panel is suitably improved by the present invention.

The invention claimed is:

1. A liquid crystal television receiver which corrects optical response characteristics of a liquid crystal panel by subjecting image data supplied to the liquid crystal display panel to enhancing conversion at least in accordance with image data of a directly previous vertical period and image data of a current vertical period, the liquid crystal television receiver being capable of reproducing images based on image data of more than one broadcasting standard, the liquid crystal television receiver comprising:

a signal type detecting section for detecting whether input image data is a video signal of a first broadcasting standard or a video signal of a second broadcasting standard, the video signal of the first broadcasting standard being different, in terms of a vertical frequency, from the video signal of the second broadcasting standard;

an enhancing conversion section for subjecting the input image data to enhancing conversion in a direction of gray level transition;

a temperature sensor for detecting a temperature in the liquid crystal television receiver; and table memories that store enhancing conversion parameters that correspond to respective temperatures in the liquid crystal television receiver and are specified by the image data of the current vertical period and the image data of the directly previous vertical period, the enhancing conversion section including an operation section that performs, using the enhancing conversion parameter read out from the table memories, an operation on the image data so as to enhance the image data, in accordance with a result of comparison between (i) a switching temperature determined by the result of the detection by the signal type detecting section and (ii) the result of the detection by the temperature sensor.

2. The liquid crystal television receiver as defined in claim 1, further comprising a control device that controls switching and selection of the enhancing conversion parameters, the control device including:

an operation section that performs, on temperature data detected by the temperature sensor, a predetermined operation corresponding to each signal type of the input image data;

a threshold discriminating section that compares the temperature data, which has been subjected to the operation by the operation section, with predetermined threshold temperature data; and a control signal output section that generates a switching control signal with which the enhancing conversion parameters are switched and controlled, in accordance with a result of comparison by the threshold discriminating section.

3. The liquid crystal television receiver as defined in claim 1, further comprising a control device that controls switching and selection of the enhancing conversion parameters, the control device including:

a threshold discriminating section that compares temperature data, which is detected by the temperature sensor, with predetermined threshold temperature data; and a control signal output section that generates a switching control signal with which the enhancing conversion parameters are switched and controlled, in accordance with a result of comparison by the threshold discriminating section.

4. A liquid crystal television receiver which corrects optical response characteristics of a liquid crystal panel by subjecting image data supplied to the liquid crystal display panel to enhancing conversion at least in accordance with image data of a directly previous vertical period and image data of a current vertical period, the liquid crystal television receiver being capable of reproducing images based on image data of more than one broadcasting standard, the liquid crystal television receiver comprising:

a signal type detecting section for detecting whether input image data is a video signal of a first broadcasting standard or a video signal of a second broadcasting standard, the video signal of the first broadcasting standard being different, in terms of a vertical frequency, from the video signal of the second broadcasting standard;

an enhancing conversion section for subjecting the input image data to enhancing conversion in a direction of gray level transition;

a temperature sensor for detecting a temperature in the liquid crystal television receiver; and table memories that store enhancing conversion parameters that correspond to respective temperatures in the liquid crystal television receiver and are specified by the image data of the current vertical period and the image data of the directly previous vertical period, at least one of the table memories being referable regardless of the signal type, and the enhancing conversion section subjecting the image data to the enhancing conversion, using the enhancing conversion parameter read out from one of the table memories that is selected and referred to in accordance with the result of detection by the signal type detecting section and the result of detection by the temperature sensor.

5. A liquid crystal television receiver which corrects optical response characteristics of a liquid crystal panel by subjecting image data supplied to the liquid crystal display panel to enhancing conversion at least in accordance with image data of a directly previous vertical period and image data of a current vertical period, the liquid crystal television receiver being capable of reproducing images based on image data of more than one broadcasting standard, the liquid crystal television receiver comprising:

a signal type detecting section for detecting whether input image data is a video signal of a first broadcasting standard or a video signal of a second broadcasting standard, the video signal of the first broadcasting standard being different, in terms of a vertical frequency, from the video signal of the second broadcasting standard;

an enhancing conversion section for subjecting the input image data to enhancing conversion in a direction of gray level transition;

a temperature sensor for detecting a temperature in the liquid crystal television receiver; and a table memory that stores an enhancing conversion parameter specified by image data of a current vertical period and image data of a directly previous vertical period, the enhancing conversion section including:

an operation section that performs an operation on the image data so as to enhance the image data, using the enhancing conversion parameter; and a multiplying section that multiplies output data of the operation section by a coefficient corresponding to the result of detection by the signal type detecting section and the result of detection by the temperature sensor.

6. A liquid crystal television receiver which corrects optical response characteristics of a liquid crystal panel by subjecting image data supplied to the liquid crystal display panel to enhancing conversion at least in accordance with image data of a directly previous vertical period and image data of a current vertical period, the liquid crystal television receiver being capable of reproducing images based on image data of more than one broadcasting standard, the liquid crystal television receiver comprising:

a signal type detecting section for detecting whether input image data is a video signal of a first broadcasting standard or a video signal of a second broadcasting standard, the video signal of the first broadcasting standard being different, in terms of a vertical frequency, from the video signal of the second broadcasting standard;

an enhancing conversion section for subjecting the input image data to enhancing conversion in a direction of gray level transition;

a temperature sensor for detecting a temperature in the liquid crystal television receiver;

a first table memory that stores an enhancing conversion parameter specified by the image data of the current vertical period and the image data of the directly previous vertical period, the first table memory being referred to when the input image data is the video signal of the first broadcasting standard; and a second table memory that stores an enhancing conversion parameter specified by the image data of the current vertical period and the image data of the directly previous vertical period, the second table memory being referred to when the input image data is the video signal of the second broadcasting standard, the enhancing conversion section including:

an operation section that performs, using the enhancing conversion parameter read out from the first or second table memory in accordance with the result of the detection by the signal type detecting section, an operation on the image data so as to enhance the image data; and a multiplying section that multiplies output data of the operation section by a coefficient corresponding to the result of detection by the temperature sensor.

7. A liquid crystal television receiver which corrects optical response characteristics of a liquid crystal panel by subjecting image data supplied to the liquid crystal display panel to enhancing conversion at least in accordance with image data of a directly previous vertical period and image data of a current vertical period, the liquid crystal television receiver being capable of reproducing images based on image data of more than one broadcasting standard, the liquid crystal television receiver comprising:

a signal type detecting section for detecting whether input image data is a video signal of a first broadcasting standard or a video signal of a second broadcasting standard, the video signal of the first broadcasting standard being different, in terms of a vertical frequency, from the video signal of the second broadcasting standard;

an enhancing conversion section for subjecting the input image data to enhancing conversion in a direction of gray level transition;

a temperature sensor for detecting a temperature in the liquid crystal television receiver;

first table memories that store enhancing conversion parameters that correspond to respective temperatures in the liquid crystal television receiver and are specified by the image data of the current vertical period and the image data of the directly previous vertical period, the first table memories being referred to when the input image data is the video signal of the first broadcasting standard; and second table memories that store enhancing conversion parameters that correspond to respective temperatures in the liquid crystal television receiver and are specified by the image data of the current vertical period and the image data of the directly previous vertical period, the second table memories being referred to when the input image data is the video signal of the second broadcasting standard, the enhancing conversion section including an operation section that performs, using the enhancing conversion parameter read out from one of the first and second table memories in accordance with the result of the detection by the signal type detecting section and the result of the detection by the temperature sensor, an operation on the image data so as to enhance the image data.

8. A liquid crystal display control method for correcting optical response characteristics of a liquid crystal display panel, by subjecting image data supplied to the liquid crystal display panel to enhancing conversion at least in accordance with image data of a directly previous vertical period and image data of a current vertical period, the liquid crystal panel being capable of reproducing images based on image data of more than one broadcasting standard, the method comprising the steps of:

(i) detecting whether a signal type of input image data is a video signal of a first broadcasting standard or a video signal of a second broadcasting standard, the video signal of the first broadcasting standard being different, in terms of a vertical frequency, from the video signal of the second broadcasting standard;

(ii) subjecting the image data to the enhancing conversion in a direction of gray level transition;

(iii) detecting a temperature in an apparatus;

(iv) referring to table memories that store enhancing conversion parameters that correspond to respective temperatures in the apparatus and are specified by the image data of the current vertical period and the image data of the directly previous vertical period; and (v) in accordance with a comparison between a switching temperature determined by the signal type detected in the step (i) and the temperature detected in the step (iii), performing an operation on the image data so as to enhance the image data, using the enhancing conversion parameter read out from one of the table memories.

9. The method as defined in claim 8, further comprising the steps of:

(vi) performing, on temperature data corresponding to the temperature detected in the step (iii), a predetermined operation corresponding to each signal type of the input image data;

(vii) comparing the temperature after being subjected to the predetermined operation with predetermined threshold temperature data; and (viii) in accordance with the comparison in the step (vii), generating a switching control signal for switching and controlling the enhancing conversion parameters.

10. The method as defined in claim 8, further comprising the steps of:

(vi) comparing temperature data corresponding to the temperature detected in the step (iii) with predetermined threshold temperature data corresponding to each signal type of the input image data; and (vii) in accordance with the comparison in the step (vi), generating a switching control signal for switching and controlling the enhancing conversion parameters.

11. A liquid crystal display control method for correcting optical response characteristics of a liquid crystal display panel, by subjecting image data supplied to the liquid crystal display panel to enhancing conversion at least in accordance with image data of a directly previous vertical period and image data of a current vertical period, the liquid crystal panel being capable of reproducing images based on image data of more than one broadcasting standard, the method comprising the steps of:

(i) detecting whether a signal type of input image data is a video signal of a first broadcasting standard or a video signal of a second broadcasting standard, the video signal of the first broadcasting standard being different, in terms of a vertical frequency, from the video signal of the second broadcasting standard;

(ii) subjecting the image data to the enhancing conversion in a direction of gray level transition; and (iii) detecting a temperature in an apparatus, in the step (ii), the image data being subjected to the enhancing conversion, using an enhancing conversion parameter read out from one of table memories that is selected and referred to in accordance with the result of detection in the step (i) and the result of detection in the step (iii), the table memories storing enhancing conversion parameters that correspond to respective temperatures in the apparatus and are specified by the image data of the current vertical period and the image data of the directly previous vertical period, and at least one of the table memories being referable regardless of the signal type.

12. A liquid crystal display control method for correcting optical response characteristics of a liquid crystal display panel, by subjecting image data supplied to the liquid crystal display panel to enhancing conversion at least in accordance with image data of a directly previous vertical period and image data of a current vertical period, the liquid crystal panel being capable of reproducing images based on image data of more than one broadcasting standard, the method comprising the steps of:

(i) detecting whether a signal type of input image data is a video signal of a first broadcasting standard or a video signal of a second broadcasting standard, the video signal of the first broadcasting standard being different, in terms of a vertical frequency, from the video signal of the second broadcasting standard;

(ii) subjecting the image data to the enhancing conversion in a direction of gray level transition;

(iii) detecting a temperature in an apparatus;

(iv) referring to a table memory that stores an enhancing conversion parameter specified by the image data of the directly previous vertical period and the image data of the current vertical period;

(v) performing an operation on the image data so as to enhance the image data, using the enhancing conversion parameter; and (vi) multiplying output data as a result of the step (v) by a coefficient corresponding to the signal type detected in the step (i) and the temperature detected in the step (iii).

13. A liquid crystal display control method for correcting optical response characteristics of a liquid crystal display panel, by subjecting image data supplied to the liquid crystal display panel to enhancing conversion at least in accordance with image data of a directly previous vertical period and image data of a current vertical period, the liquid crystal panel being capable of reproducing images based on image data of more than one broadcasting standard, the method comprising the steps of:

(i) detecting whether a signal type of input image data is a video signal of a first broadcasting standard or a video signal of a second broadcasting standard, the video signal of the first broadcasting standard being different, in terms of a vertical frequency, from the video signal of the second broadcasting standard;

(ii) subjecting the image data to the enhancing conversion in a direction of gray level transition;

(iii) detecting a temperature in an apparatus;

(iv) referring to first table memory that stores an enhancing conversion parameter specified by the image data of the current vertical period and the image data of the directly previous vertical period, the first table memory being referred to in a case where the input image data is the video signal of the first broadcasting standard;

(v) referring to second table memory that stores an enhancing conversion parameter specified by the image data of the current vertical period and the image data of the directly previous vertical period, the second table memory being referred to in a case where the input image data is the video signal of the second broadcasting standard;

(vi) in accordance with the signal type detected in the step (i), performing an operation on the image data so as to enhance the image data, using the enhancing conversion parameter read out from the first or second table memory; and (vii) multiplying output data as a result of the step (vi) by a coefficient corresponding to each temperature detected in the step (iii).

14. A liquid crystal display control method for correcting optical response characteristics of a liquid crystal display panel, by subjecting image data supplied to the liquid crystal display panel to enhancing conversion at least in accordance with image data of a directly previous vertical period and image data of a current vertical period, the liquid crystal panel being capable of reproducing images based on image data of more than one broadcasting standard, the method comprising the steps of:

(i) detecting whether a signal type of input image data is a video signal of a first broadcasting standard or a video signal of a second broadcasting standard, the video signal of the first broadcasting standard being different, in terms of a vertical frequency, from the video signal of the second broadcasting standard;

(ii) subjecting the image data to the enhancing conversion in a direction of gray level transition;

(iii) detecting a temperature in an apparatus;

(iv) referring to first table memories that store enhancing conversion parameters that correspond to respective temperatures in the apparatus and are specified by the image data of the current vertical period and the image data of the directly previous vertical period, the first table memories being referred to in a case where the input image data is the video signal of the first broadcasting standard;

(v) referring to second table memories that store enhancing conversion parameters that correspond to respective temperatures in the apparatus and are specified by the image data of the current vertical period and the image data of the directly previous vertical period, the second table memories being referred to in a case where the input image data is the video signal of the second broadcasting standard; and (vi) in accordance with the signal type detected in the step (i) and the temperature detected in the step (iii), performing an operation on the image data so as to enhance the image data, using the enhancing conversion parameter read out from one of the first and second table memories.

15. A recording medium recording a program for a computer that controls a liquid crystal television receiver capable of reproducing images based on image data of more than one broadcasting standards, the liquid crystal television receiver correcting optical response characteristics of a liquid crystal display panel by performing an enhancing conversion of image data supplied to the liquid crystal display panel, in accordance with image data of a directly previous vertical period and image data of a current vertical period, in such a manner as to causing the liquid crystal panel to have a transmittance specified by the image data, within a predetermined period of time, the program causing the computer to perform the steps defined in claim 8.

* * * * *